(12) United States Patent
Kobayashi et al.

(10) Patent No.: US 12,076,896 B2
(45) Date of Patent: Sep. 3, 2024

(54) APPARATUS, MOLD, INJECTION MOLDING MACHINE, MANUFACTURING UNIT, METHOD FOR MANUFACTURING RESIN MOLDED PRODUCT, AND VALVE UNIT

(71) Applicant: CANON KABUSHIKI KAISHA, Tokyo (JP)

(72) Inventors: Toshiki Kobayashi, Kanagawa (JP); Kota Yagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 17/666,797

(22) Filed: Feb. 8, 2022

(65) Prior Publication Data
US 2022/0274304 A1    Sep. 1, 2022

(30) Foreign Application Priority Data

Mar. 1, 2021 (JP) .................................. 2021-031860
Jan. 17, 2022 (JP) .................................. 2022-005160

(51) Int. Cl.
*F16K 15/04* (2006.01)
*B29C 45/17* (2006.01)
(Continued)

(52) U.S. Cl.
CPC ...... *B29C 45/2703* (2013.01); *B29C 45/1775* (2013.01); *B29C 45/461* (2013.01);
(Continued)

(58) Field of Classification Search
CPC ...... F16K 15/04; F16K 15/06; F16K 27/0254; F16K 17/12; F16K 15/048
See application file for complete search history.

(56) References Cited

U.S. PATENT DOCUMENTS 1,836,384 A * 12/1931 Mohr ..................... B23K 5/006
    411/965
3,620,653 A * 11/1971 Gaylord .................. F16K 15/04
    137/533.15
(Continued)

FOREIGN PATENT DOCUMENTS

JP    59-48822 U    3/1984
JP    59-49902 B2   12/1984
(Continued)

OTHER PUBLICATIONS

Copyright © 2016~2024 | Upmold.com Rockwell—Rockwell Superficial—Brinell—Vickers—Shore Hardness Conversion (Year: 2016).*

*Primary Examiner* — P. Macade Nichols
(74) *Attorney, Agent, or Firm* — Venable LLP

(57) ABSTRACT

An apparatus includes a first flow path member configured to define a first section of a flow path, a second flow path member configured to define a second section of the flow path, and a valve unit configured to suppress backflow in the flow path. The first section and the second section are connected via the valve unit. The valve unit comprises a displaceable valve body and a first valve seat portion. The first valve seat portion is configured to close the flow path in a case where the valve body abuts. The first valve seat portion is configured to abut on the first flow path member and is made of a material having higher hardness than that of a material constituting the first flow path member.

16 Claims, 17 Drawing Sheets

(51) Int. Cl.
 *B29C 45/27* (2006.01)
 *B29C 45/46* (2006.01)
 *B29C 45/77* (2006.01)
(52) U.S. Cl.
 CPC .... *B29C 45/77* (2013.01); *B29C 2945/76006* (2013.01); *B29C 2945/76367* (2013.01)

(56) References Cited

U.S. PATENT DOCUMENTS

| | | |
|---|---|---|
| 5,106,283 A | 4/1992 | Sauer et al. |
| 2018/0180190 A1* | 6/2018 | Abbing ................ F16K 15/147 |

FOREIGN PATENT DOCUMENTS

| | | |
|---|---|---|
| JP | 63-21397 Y2 | 2/1988 |
| JP | 63-21397 Y2 | 6/1988 |
| JP | 6-39878 A | 2/1994 |
| JP | 6-206242 A | 7/1994 |
| JP | 10-44193 A | 2/1998 |
| JP | 10-263780 A | 10/1998 |
| JP | 2004-255588 A | 9/2004 |
| JP | 2004-330672 A | 11/2004 |
| JP | 2007-185842 A | 7/2007 |
| JP | 2008-223997 A | 9/2008 |
| JP | 2010-082950 A | 4/2010 |
| JP | 2014-188817 A | 10/2014 |

* cited by examiner

L1 + L2 < LB

FORWARD FLOW DIRECTION ⇐

REVERSE FLOW DIRECTION ⇒

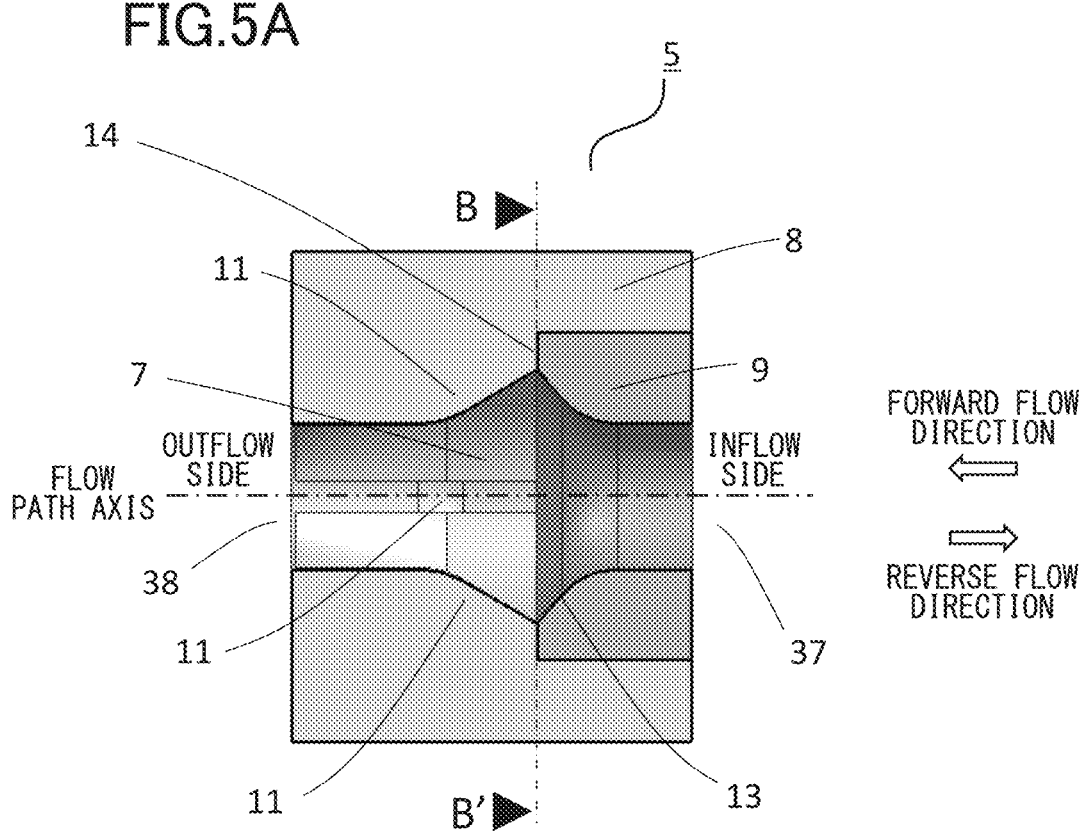
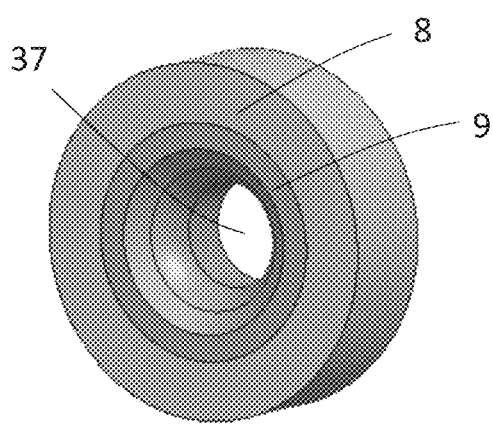

APPARATUS, MOLD, INJECTION MOLDING MACHINE, MANUFACTURING UNIT, METHOD FOR MANUFACTURING RESIN MOLDED PRODUCT, AND VALVE UNIT

BACKGROUND OF THE INVENTION

Field of the Invention

The present invention relates to a flow path of a molten resin capable of suppressing backflow in a device that handles a molten resin, such as an injection molding machine.

Description of the Related Art

Hitherto, an injection molding method has been known as a method for manufacturing a resin product. In the injection molding method, a molten resin is injected into a cavity space inside a mold using a screw, a plunger, or the like, and cooled and solidified in the mold, and after the solidification, the mold is opened to take out a molded product. By repeating a series of operations from injection of the molten resin to removal of the molded product, the resin molded product is continuously mass-produced. As a device for performing the injection molding method, for example, a pre-plunger type (hereinafter, it is referred to as a preplastication type) molding machine or an in-line screw type molding machine is known.

For example, a preplastication type injection molding machine includes a plasticizing mechanism including a screw and a plunger for injecting a molten resin material, and the screw and the plunger are connected by a flow path, and a valve is provided in the middle of the flow path. The molten resin extruded from the screw into the flow path passes through the valve in the open state and is supplied to a plunger side. Thereafter, by closing the valve and advancing the plunger, the molten resin is injected into the mold cavity. At this time, by closing the valve, the resin is prevented from flowing back toward the screw side, and an appropriate injection pressure is secured. As a valve capable of opening and closing the flow path of the molten resin, there is a method of operating by externally supplying power to an opening/closing mechanism, but a method of a simpler structure is also studied. Japanese Patent Application Laid-Open No. 2004-255588 and Japanese Patent Application Laid-Open No. 2004-330672 describe a backflow prevention valve that performs an opening/closing operation by moving a valve body using a pressure difference between molten resin before and after the valve.

The backflow prevention valve that opens and closes using the pressure difference between the molten resin before and after the valve has an advantage that the structure can be simplified as compared with a system in which power is supplied from the outside to the opening/closing mechanism. For this reason, the backflow prevention valve that opens and closes using the pressure difference can be installed not only between the screw and the plunger of the preplastication type injection molding machine but also at various positions of the flow path of the molten resin of the injection molding machine according to the purpose.

In the backflow prevention valve described in Japanese Patent Application Laid-Open No. 2004-255588 and Japanese Patent Application Laid-Open No. 2004-330672, at the time of the opening operation, the valve body moves in the valve and abuts on the stopper due to the pressure difference of the molten resin applied in a forward flow direction, and the stopper has a structure in which the flow path opening is secured even if the valve body abuts on the stopper. In addition, at the time of the closing operation, the valve body moves in the valve and comes into pressure contact with the valve seat due to the pressure difference of the molten resin applied in a reverse flow direction, and the flow path is closed by the close contact between the valve body and the valve seat.

In such a conventional backflow prevention valve, the valve body and the valve seat, or the valve body and the stopper are repeatedly pressed against and separated from each other during operation of the injection molding machine, and these portions are worn. In particular, during the closing operation, the pressure difference between the molten resin before and after the valve directly acts on an abutting portion between the valve body and the valve seat, and thus, the abutting portion is easily worn. When the valve seat is damaged, the flow path of the molten resin cannot be completely closed, and the backflow prevention function is deteriorated. Therefore, in order to enable the injection molding machine to stably operate for a long period of time, it has been required to improve the durability of the backflow prevention valve.

In addition, although not studied in Japanese Patent Application Laid-Open No. 2004-255588 A and Japanese Patent Application Laid-Open No. 2004-330672 A, when the backflow prevention valve is worn, it is necessary to remove the worn backflow prevention valve from the injection molding machine and install a new or repaired backflow prevention valve again in the injection molding machine. Assuming such replacement, there is a demand for a method capable of easily attaching and detaching the backflow prevention valve and mounting the backflow prevention valve to the flow path with a high degree of adhesion so that the molten resin does not leak from the mounting portion.

SUMMARY OF THE INVENTION

According to a first aspect of the present invention, an apparatus includes a first flow path member configured to define a first section of a flow path, a second flow path member configured to define a second section of the flow path, a valve unit configured to suppress backflow in the flow path, and a fastening member configured to fasten the first flow path member and the second flow path member. In a state where the first flow path member and the second flow path member are fastened by the fastening member, the valve unit is sandwiched between the first flow path member and the second flow path member, and the first section and the second section are connected via the valve unit. The valve unit is detachable from the first flow path member and the second flow path member in a state where the fastening of the first flow path member and the second flow path member by the fastening member are released.

According to a second aspect of the present invention, an apparatus includes a first flow path member configured to define a first section of a flow path, a second flow path member configured to define a second section of the flow path, and a valve unit configured to suppress backflow in the flow path. The first section and the second section are connected via the valve unit. The valve unit comprises a displaceable valve body and a first valve seat portion configured to close the flow path in a case where the displaceable valve body abuts on the first valve seat portion. The first valve seat portion is configured to abut on the first flow path member and is made of a material having higher hardness than that of a material constituting the first flow path member.

According to a third aspect of the present invention, a valve unit is configured to suppress backflow in a flow path. The valve unit includes a displaceable valve body, and a first valve seat portion configured to close the flow path in a case where the displaceable valve body abuts on the first valve seat portion. The first valve seat portion is formed of a material having a hardness (Rockwell hardness) of HRC 50 or more and less than 80.

Further features of the present invention will become apparent from the following description of exemplary embodiments with reference to the attached drawings.

BRIEF DESCRIPTION OF THE DRAWINGS

FIG. 5A is a schematic cross-sectional view of the backflow prevention valve 5 according to the first embodiment.

FIG. 5B is a schematic perspective view in which the backflow prevention valve 5 is cut into two along a B-B' plane illustrated in FIG. 5A and a fragment on a side including an inlet 37 is viewed from an outflow side.

DESCRIPTION OF THE EMBODIMENTS

Figure 1:
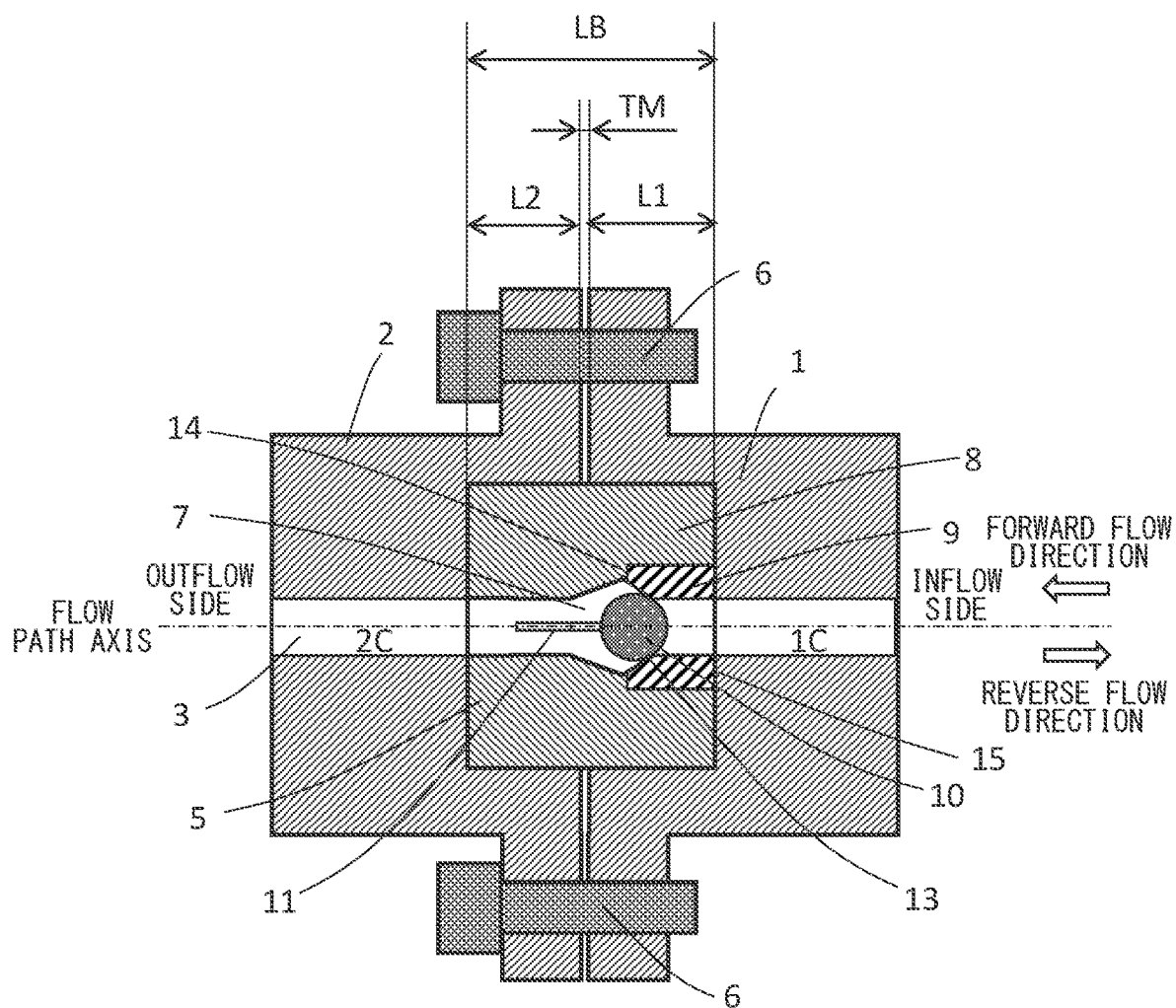
FIG. 1 is a schematic cross-sectional view illustrating a state in which a backflow prevention valve 5 according to a first embodiment is mounted in a flow path of a molten resin.

A flow path of a molten resin including a backflow prevention valve, an injection molding machine, and the like according to embodiments of the present invention will be described with reference to the drawings. In the drawings referred to in the following descriptions of the embodiments, elements denoted by the same reference numerals have the same functions unless otherwise specified.

First Embodiment

Figure 2:
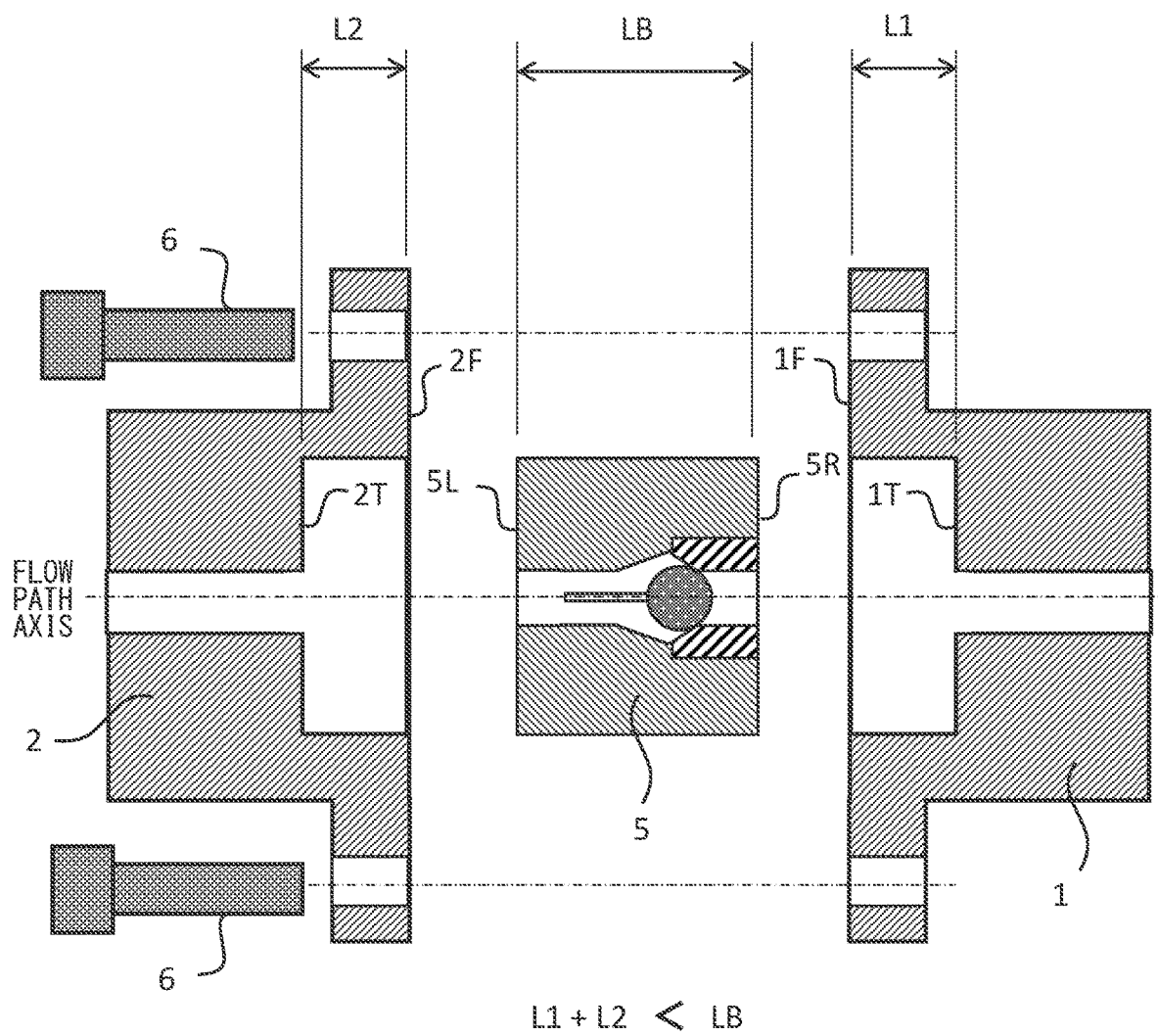
FIG. 2 is a schematic cross-sectional view illustrating a state before the backflow prevention valve 5 according to the first embodiment is incorporated into the flow path of the molten resin.

A backflow prevention valve according to a first embodiment, a method of mounting the backflow prevention valve in a flow path of a molten resin, and the like will be described. FIG. 1 is a cross-sectional view schematically illustrating a state in which a backflow prevention valve 5 according to a first embodiment is mounted in a flow path of a molten resin. FIG. 2 is a cross-sectional view schematically illustrating a state before the backflow prevention valve 5 is incorporated in the flow path of the molten resin. In FIG. 1, a forward flow direction and a reverse flow direction of the molten resin are indicated by arrows, and an inflow side and an outflow side of the molten resin into the flow path are indicated with reference to the forward flow direction. The backflow prevention valve 5 serving as a valve unit includes a valve body 10, a first valve seat portion 9, a second valve seat portion 11, and a housing 8. An operation of each part of the backflow prevention valve 5 will be described later.

The backflow prevention valve 5 is sandwiched between a first flow path member 1 and a second flow path member 2 in a right-left direction in the drawing, and the first flow path member 1 and the second flow path member 2 are fastened by bolts 6 which are fastening members at a flange portion. In the first flow path member 1, a first flow path section 1C is defined as a portion of the flow path of the molten resin, and in the second flow path member 2, a second flow path section 2C is defined as a portion of the flow path of the molten resin. The first flow path section 1C and the second flow path section 2C are connected via the backflow prevention valve 5 to constitute a series of flow paths 3 through which the molten resin flows.

As illustrated in FIG. 2, the first flow path member 1 is provided with a recess having a depth L1 with respect to a flange surface 1F when viewed in a flow path axial direction. The second flow path member 2 is provided with a recess having a depth L2 with respect to a flange surface 2F when viewed in the flow path axial direction. An end surface (bottom surface) of the recess of the first flow path member 1 is defined as 1T, and an end surface (bottom surface) of the recess of the second flow path member 2 is defined as 2T. In the backflow prevention valve 5, when an end surface on the first flow path member 1 side is defined as 5R and an end surface on the second flow path member 2 side is defined as 5L, a distance between 5L and 5R is set to LB. That is, a length of the backflow prevention valve 5 as viewed in the flow path axial direction is LB.

In the present embodiment, dimensions of each portion are defined so as to satisfy the following Expression (1).

$$L1+L2<LB \quad (1)$$

In the assembled state as illustrated in FIG. 1, the end surface 1T of the first flow path member 1 and the end surface 5R of the backflow prevention valve 5 abut on each other, and the end surface 2T of the second flow path member 2 and the end surface 5L of the backflow prevention valve 5 abut on each other. Meanwhile, since the first flow path member 1 and the second flow path member 2 have a dimensional relationship defined by Expression (1), the first flow path member 1 and the second flow path member 2 can be strongly fastened by the bolts 6. Since the first flow path member 1, the second flow path member 2, and a housing 8 of the backflow prevention valve 5 may be considered to be substantially rigid, a distance TM serving as a fastening allowance is substantially equal to LB−(L1+L2). Specifically, the distance TM serving as the fastening allowance is preferably set within a range of 2 μm or more and 100 μm or less, and particularly preferably within a range of 7 μm or more and 50 μm or less. This is to enable reliable tightening with a strong fastening force and to prevent the bolt from buckling when an external force is applied between the first flow path member 1 and the second flow path member 2.

According to the present embodiment, since the distance TM serving as the fastening allowance is secured by the dimensional relationship defined in Expression (1), the first flow path member 1 and the second flow path member 2 sandwiching the backflow prevention valve 5 can be fastened with a sufficient force using the bolts 6. Therefore, the end surface 1T and the end surface 5R, and the end surface 2T and the end surface 5L can be brought into close contact with each other by applying sufficient pressure, and the molten resin can be prevented from leaking from an interface between the backflow prevention valve 5 and the first flow path member 1 and an interface between the backflow prevention valve 5 and the second flow path member 2.

According to the present embodiment, since sufficient sealing can be realized without joining the flow path member and the backflow prevention valve by brazing or the like, mounting of the backflow prevention valve is easy. In addition, even when the backflow prevention valve is replaced, the backflow prevention valve can be easily removed from the flow path member as illustrated in FIG. 2 by removing the fastening member (bolt), and thus, a load required for maintenance of the injection molding machine can be greatly reduced.

The depth L1 of the recess of the first flow path member 1 and the depth L2 of the recess of the second flow path member 2 can be set to any size as long as Expression (1) is satisfied. For example, a recess may be provided only in one of the first flow path member 1 and the second flow path member 2, and the other may have a depth of 0 (that is, a flat surface).

Next, the backflow prevention valve 5 serving as a valve unit will be described in detail. As illustrated in FIG. 1, the backflow prevention valve 5 includes the valve body 10, the first valve seat portion 9, the second valve seat portion 11, and the housing 8.

Figure 3A:
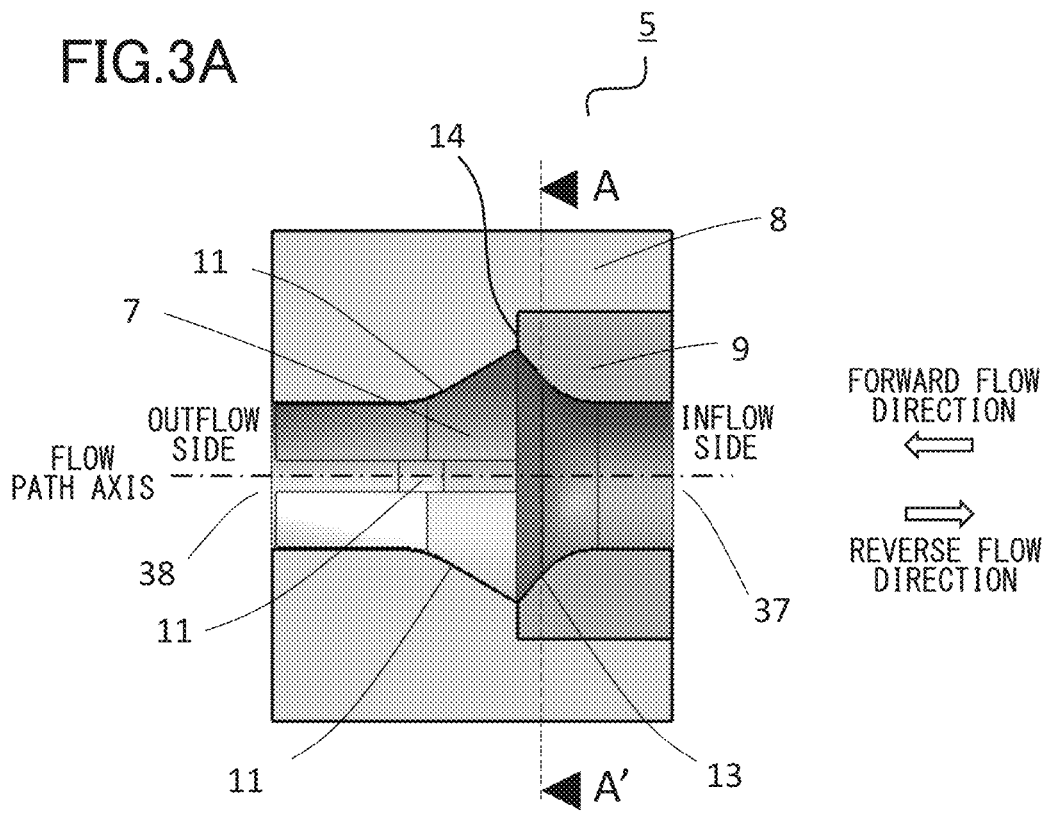
FIG. 3A is a schematic cross-sectional view of the backflow prevention valve 5 according to the first embodiment.

FIG. 3A is a schematic cross-sectional view of the backflow prevention valve 5, but illustration of the valve body 10 is omitted for convenience of description. A flow path of molten resin connecting an inlet 37 and an outlet 38 is formed inside the backflow prevention valve 5, and a spherical valve body 10 illustrated in FIG. 1 is accommodated in the flow path so as to be displaceable (movable). Since the spherical valve body 10 is larger in diameter than both the inlet 37 and the outlet 38, the valve body 10 is present at any position in a valve chamber 7 without deviating from the inside of the backflow prevention valve 5.

A recess is provided on the inflow side of the housing 8, and the first valve seat portion 9 is fitted into the recess. A bottom surface of the recess and a distal end surface of the first valve seat portion 9 are in contact with each other at a boundary portion 14. In the present embodiment, a flow path cross-sectional area of the molten resin in the backflow prevention valve 5 is maximized at the boundary portion 14 where the bottom surface of the recess of the housing 8 and the distal end surface of the first valve seat portion 9 abut on each other. This is because the high-pressure molten resin is less likely to leak from the boundary portion. However, depending on the pressure of the molten resin in the valve chamber 7, the boundary portion 14 may be separated from the position where the flow path cross-sectional area is maximized.

Figure 3B:
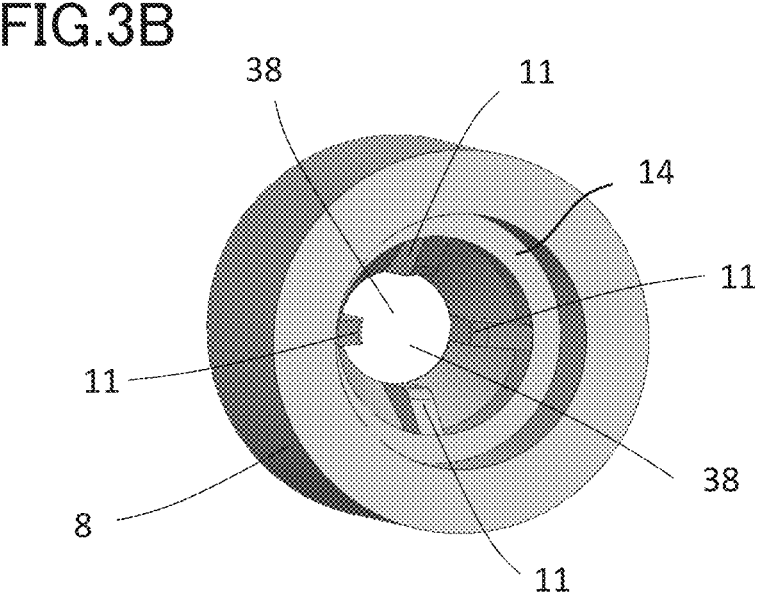
FIG. 3B is a schematic perspective view in which the backflow prevention valve 5 is cut into two along an A-A' plane illustrated in FIG. 3A and a fragment on a side including an outlet 38 is viewed from an inflow side.

First, a description will be given regarding that the backflow prevention valve 5 is opened when the molten resin is about to flow in the forward flow direction. FIG. 3B is a schematic perspective view in which the backflow prevention valve 5 is cut into two along an A-A' plane illustrated in FIG. 3A and a fragment on a side including the outlet 38 of the housing 8 is viewed from the inflow side. The second valve seat portion 11 for holding the valve body 10 in the flow path without closing the flow path when the molten resin flows in the forward flow direction is provided on the outflow side of the flow path. The second valve seat portion 11 includes four protrusions (stoppers) dispersedly arranged in an outer peripheral direction of the flow path, and when the molten resin flows in the forward flow direction, the valve body 10 is pressed against these protrusions by a flow pressure.

Figure 4A:
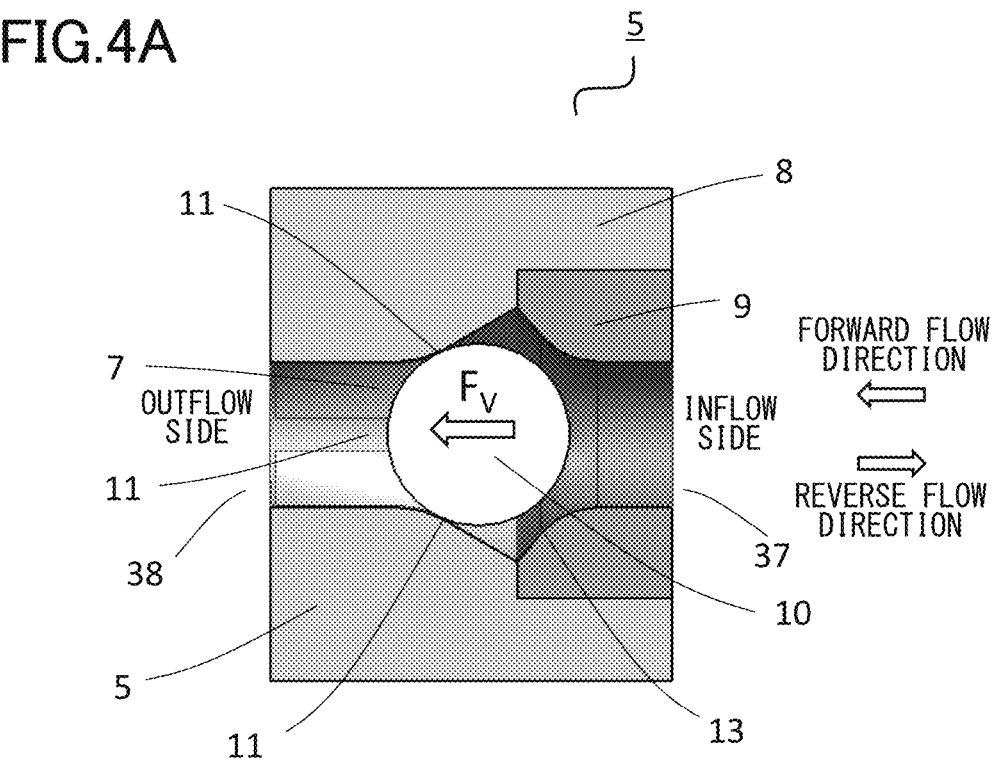
FIG. 4A is a schematic cross-sectional view illustrating a state in which the molten resin flows in a forward flow direction.
Figure 4B:
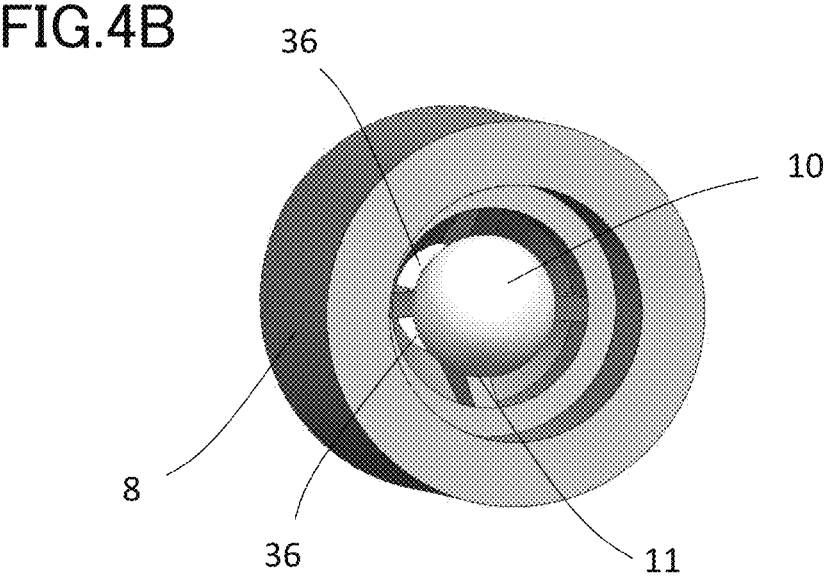
FIG. 4B is a schematic perspective view illustrating the state in which the molten resin flows in the forward flow direction.

In order to describe this state, FIG. 4A is a schematic cross-sectional view of the backflow prevention valve 5, and FIG. 4B is a schematic perspective view virtually cut similarly to FIG. 3B. The spherical valve body 10 receives a force of $F_V$ by the flow pressure in the forward flow direction and abuts on inclined surfaces of the protrusions of the second valve seat portion 11, and a gap 36 through which the molten resin can pass is secured between the protrusions. Therefore, the molten resin can flow out from the outlet 38, and the backflow prevention valve 5 maintains the open state with respect to the flow in the forward flow direction.

A ridgeline of the protrusion of the second valve seat portion 11 is inclined so as to approach an axial center of a flow path axis from the inflow side toward the outflow side, and has a shape in which there is no undercut portion that becomes a shadow when the protrusion is viewed in a plan view along the flow path axis from the inflow side. As a result, the molten resin flowing in the forward flow direction does not stay in the vicinity of the protrusion, and resin deterioration due to the stay is suppressed.

Next, a description will be given regarding that the backflow prevention valve 5 is closed when the molten resin is about to flow in the reverse flow direction. FIG. 5A is a schematic cross-sectional view of the backflow prevention valve 5, but illustration of the valve body 10 is omitted for convenience of description. FIG. 5B is a schematic perspective view in which the backflow prevention valve 5 is cut into two along a B-B' plane illustrated in FIG. 5A and a fragment on a side including an inlet 37 is viewed from the outflow side. The B-B' plane is a surface passing through the boundary portion 14 where the bottom surface of the recess of the housing 8 and the distal end surface of the first valve seat portion 9 abut on each other, and the flow path has the maximum cross-sectional area at this position. The first valve seat portion 9 is a cylindrical member, but a conical surface shape portion 13 having a diameter decreasing from the outflow side toward the inflow side exists on the inner surface of the cylinder. When the molten resin is about to flow in the reverse flow direction, the spherical valve body 10 is pressed against the conical surface shape portion 13 of the inner surface of the first valve seat portion 9 by the flow pressure.

Figure 6A:
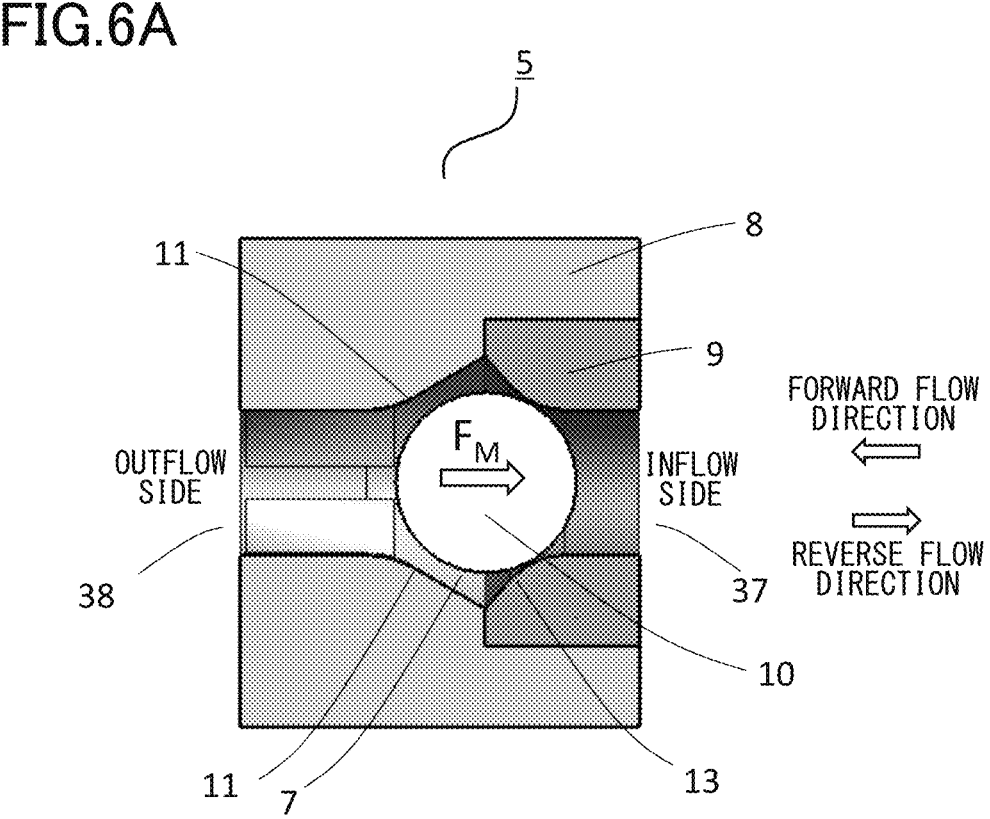
FIG. 6A is a schematic cross-sectional view illustrating a state in which the molten resin is about to flow in a reverse flow direction.
Figure 6B:
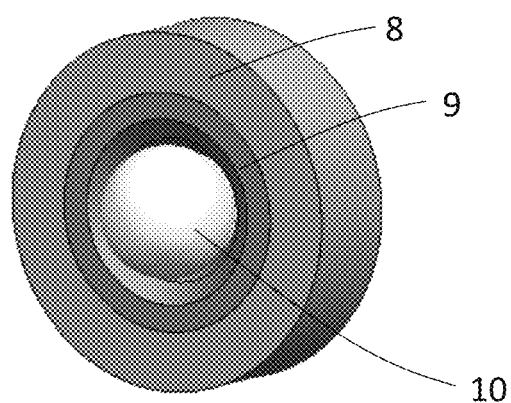
FIG. 6B is a schematic perspective view illustrating the state in which the molten resin is about to flow in the reverse flow direction.

In order to describe this state, FIG. 6A is a schematic cross-sectional view of the backflow prevention valve 5, and FIG. 6B is a schematic perspective view virtually cut similarly to FIG. 5B. The spherical valve body 10 receives a force of $F_M$ by the flow pressure in the reverse flow direction and abuts on the conical surface shape portion 13 of the first valve seat portion 9, and there is no gap through which the molten resin can flow between the valve body 10 and the first valve seat portion 9. Therefore, the molten resin cannot flow backward and flow out from the inlet 37, the backflow prevention valve 5 is closed with respect to the flow in the reverse flow direction, and thus, the flow path of the molten resin can be closed.

Although the open state and the closed state of the backflow prevention valve 5 have been described above, the configuration of each portion of the backflow prevention valve 5 will be described in more detail. When the backflow prevention valve 5 is mounted on an injection molding machine or the like and the opening/closing operation of the flow path is repeated, the valve body 10 is repeatedly pressed against the protrusion of the second valve seat portion 11 and the first valve seat portion 9. When the molten resin flows in the forward flow direction and the valve is in the open state, since the gap 36 through which the molten resin can pass is secured, the pressure at which the valve body 10 is pressed against the protrusion of the second valve seat portion 11 is not so large. Meanwhile, when the molten resin is about to flow in the reverse flow direction and the flow path is closed, the flow path is closed, and thus, a large flow pressure is applied to the valve body 10, and the first valve seat portion 9 receives a strong force from the valve body 10.

In the present embodiment, in order to improve the durability of the first valve seat portion 9, the first valve seat portion 9 is formed using a material having higher hardness than the first flow path member 1, and the first valve seat portion 9 is mounted on the housing 8. The second valve seat portion 11 including a protrusion having a complicated shape although having a relatively small force to be pressed against the valve body is formed integrally with the housing 8 using a material having excellent processability. Meanwhile, the first valve seat portion 9 requiring more durability is formed using a material having higher hardness than the material used for the first flow path member 1, and is mounted on the housing 8.

The outer peripheral surface of the cylindrical first valve seat portion 9 has a columnar shape, and is fitted in a recess provided in the housing 8. As a fitting method, shrinkage fitting having high adhesion strength is preferable from the viewpoint of suppressing resin leakage. In some cases, other fitting methods such as light press fitting may be used. An inflow-side end surface 15 of the first valve seat portion 9 is flush with an inflow-side end surface of the housing 8 or slightly protrudes toward the inflow side. This is because when the first flow path member 1 and the second flow path member 2 are fastened with the bolts 6, the first valve seat portion 9 and the first flow path member 1 are firmly brought into close contact with each other to prevent leakage of the molten resin.

Figure 7:
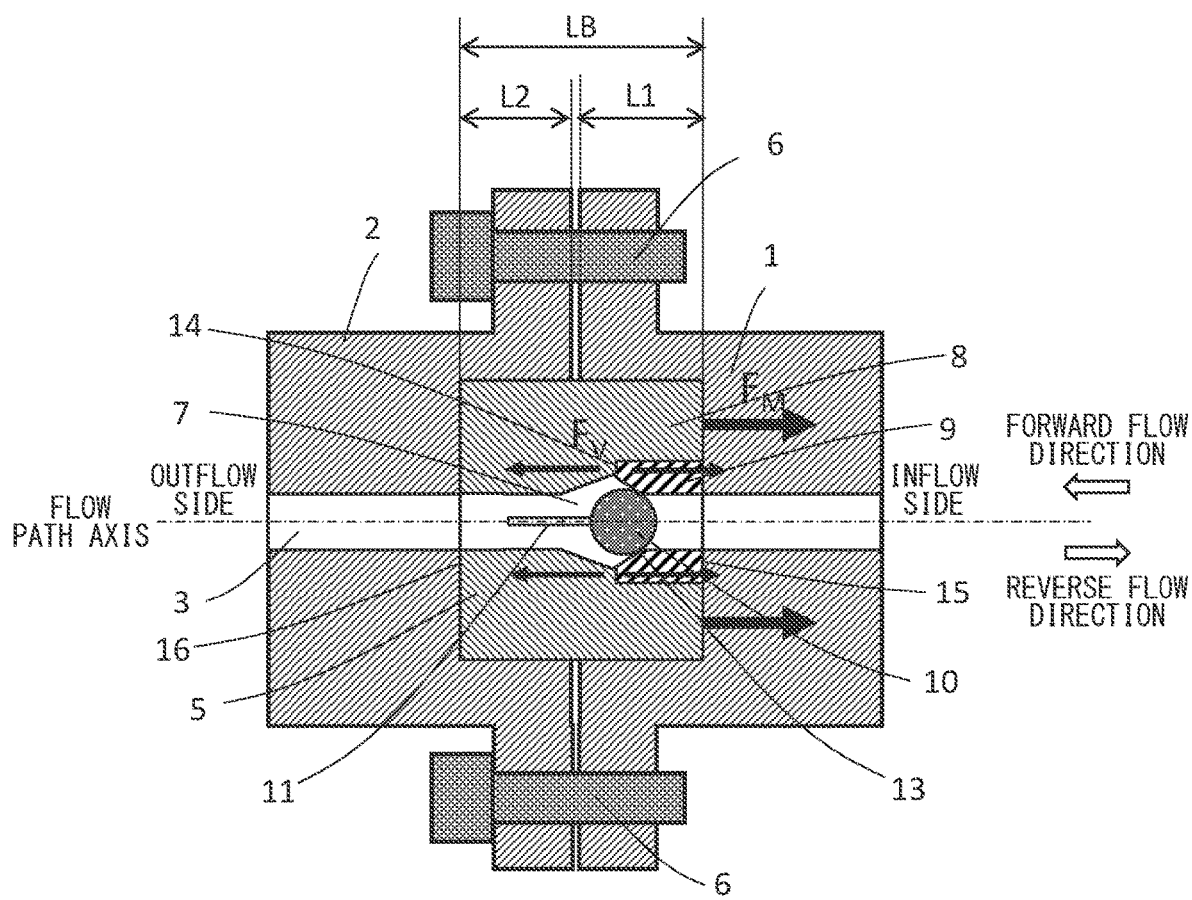
FIG. 7 is a schematic cross-sectional view illustrating a force applied to each portion in a state where the backflow prevention valve 5 is closed.

Next, a force applied to each portion in the closed state of the backflow prevention valve 5 will be described in more detail with reference to FIG. 7. FIG. 7 is a cross-sectional view schematically illustrating a state in which pressure is applied in the reverse flow direction and the backflow prevention valve 5 is closed.

Since the first valve seat portion 9 is pushed in the reverse flow direction by the valve body 10 and high pressure is applied in the valve chamber 7, a force $F_V$ for generating a gap is generated at the boundary portion 14 between the housing 8 and the first valve seat portion 9. Due to this force, a minute gap may be generated at an end of the boundary portion 14, and the molten resin may infiltrate. However, since the first valve seat portion 9 is firmly fitted to the housing 8 by shrinkage fitting or the like, the molten resin does not leak from between the cylindrical outer surface of the first valve seat portion 9 and the recessed inner surface of the housing 8. That is, the molten resin does not enter an abutment surface between the backflow prevention valve 5 and the first flow path member 1, and the molten resin does not leak to the outside.

In the closed state, since the valve body 10 is pressed against the first valve seat portion 9, the entire valve unit of the backflow prevention valve 5 is pressed against the inflow side by the force $F_M$. This force acts in a direction in which the outflow-side end surface 16 of the backflow prevention valve 5 is to be separated from the end surface of the second flow path member 2. However, as already described with reference to FIG. 1 and the like, since the present embodiment is configured to have the dimensional relationship in which the distance TM serving as the fastening allowance is provided, the first flow path member 1 and the second flow path member 2 are firmly fastened with the bolt 6. As a result, the molten resin is prevented from leaking to the outside from the abutting portion between the backflow prevention valve 5 and the second flow path member 2.

Although the open state and the closed state have been described above, the materials constituting each part will be supplemented. As the first flow path member 1 and the second flow path member 2, a material (for example, SUS-based steel material) having a hardness (Rockwell hardness) of HRC 20 or more and less than 50 is suitable from the viewpoint of a balance between processability at the time of manufacturing and durability at the time of use.

As the housing 8 of the backflow prevention valve, for example, an alloy tool steel (SKD11, die steel) having a hardness (Rockwell hardness) of HRC 62, a high speed steel (SKH51, high speed steel) having a hardness of HRC 63, or an SUS material having a hardness of HRC 50 to 55 is suitable. This is because of the viewpoint of the balance between the processability when forming the recess for receiving the first valve seat portion 9 and the protrusion of the second valve seat portion 11 and the durability at the time of use.

For the first valve seat portion 9, a material having a hardness (Rockwell hardness) of HRC 50 or more and less than 80 is suitable. In order to enhance the durability during use, a material having higher hardness than the first flow path member 1 and not having such high hardness that processing becomes excessively difficult is selected. Specifically, alloy tool steel (SKD11, die steel) having a hardness (Rockwell hardness) of HRC 62, high speed steel (SKH51, High-speed steel) having a hardness of HRC 63, or an SUS-based material having a hardness of HRC 50 to 55 is suitable. As the valve body 10, from the viewpoint of durability, for example, cemented carbide (cemented carbide) having a hardness (Rockwell hardness) of HRC 78 is suitable.

In addition, when the molten resin actually flows, each portion of the device has a high temperature. In this case, in order to prevent a gap from being generated due to a thermal expansion difference and sealing of the flow path from decreasing, the first flow path member 1, the second flow path member 2, the housing 8, and the first valve seat portion 9 are all formed using a material having a linear expansion coefficient in a range of $9 \times 10^{-6}$/K or more and $13 \times 10^{-6}$/K or less. In particular, in order to ensure the adhesion between the first valve seat portion 9 and the abutting portion of the first flow path member 1, it is preferable that the linear expansion coefficient of the material constituting the first valve seat portion 9 is larger than the linear expansion coefficient of the material constituting the first flow path member 1 within the above range.

A preferable combination example of the materials forming each portion is as follows.

The first flow path member 1 and the second flow path member 2 are formed of an SUS-based steel material (for example, HPM77 manufactured by Hitachi Metals Co., Ltd.) having a hardness of HRC 29 or more and 33 or less and a linear expansion coefficient of $10.1 \times 10^{-6}$/K or more and $11.5 \times 10^{-6}$/K or less. The housing 8 of the backflow prevention valve is formed of an SUS-based material having a hardness of HRC 50 to 55. The first valve seat portion 9 is formed of high speed steel (SKH51, high speed steel) having a hardness of HRC 63 and a linear expansion coefficient of $11.9 \times 10^{-6}$/K. The valve body 10 is formed of cemented carbide (cemented carbide) having a hardness of HRC 78.

According to the present embodiment described above, since the first valve seat portion 9 with which the valve body 10 contacts with a strong force when preventing the backflow is formed of a material having a hardness higher than that of the first flow path member, durability of the backflow prevention valve 5 is improved, and the backflow prevention valve 5 can be stably operated for a long period of time.

In addition, the first flow path member 1 and the second flow path member 2 are firmly fastened by the bolts 6 in a state where the first flow path member 1 and the second flow path member 2 sandwich the backflow prevention valve 5, and the first flow path member 1 and the second flow path member 2 are separated from each other via the fastening allowance of the bolt 6. With the structure capable of exerting a strong fastening force, the first flow path member 1 and the backflow prevention valve 5, and the second flow path member 2 and the backflow prevention valve 5 are in close contact with (abut on) each other with a strong force, and thus, it is possible to prevent the molten resin from leaking from the gap.

According to the present embodiment, since sufficient sealing can be realized without joining the flow path member and the backflow prevention valve by brazing or the like, mounting of the backflow prevention valve is easy. In addition, when the backflow prevention valve is replaced, the backflow prevention valve can be easily detached from the flow path member by detaching and releasing the fastening member (bolt), and the load required for maintenance of the injection molding machine can be significantly reduced.

Second Embodiment

Figure 8:
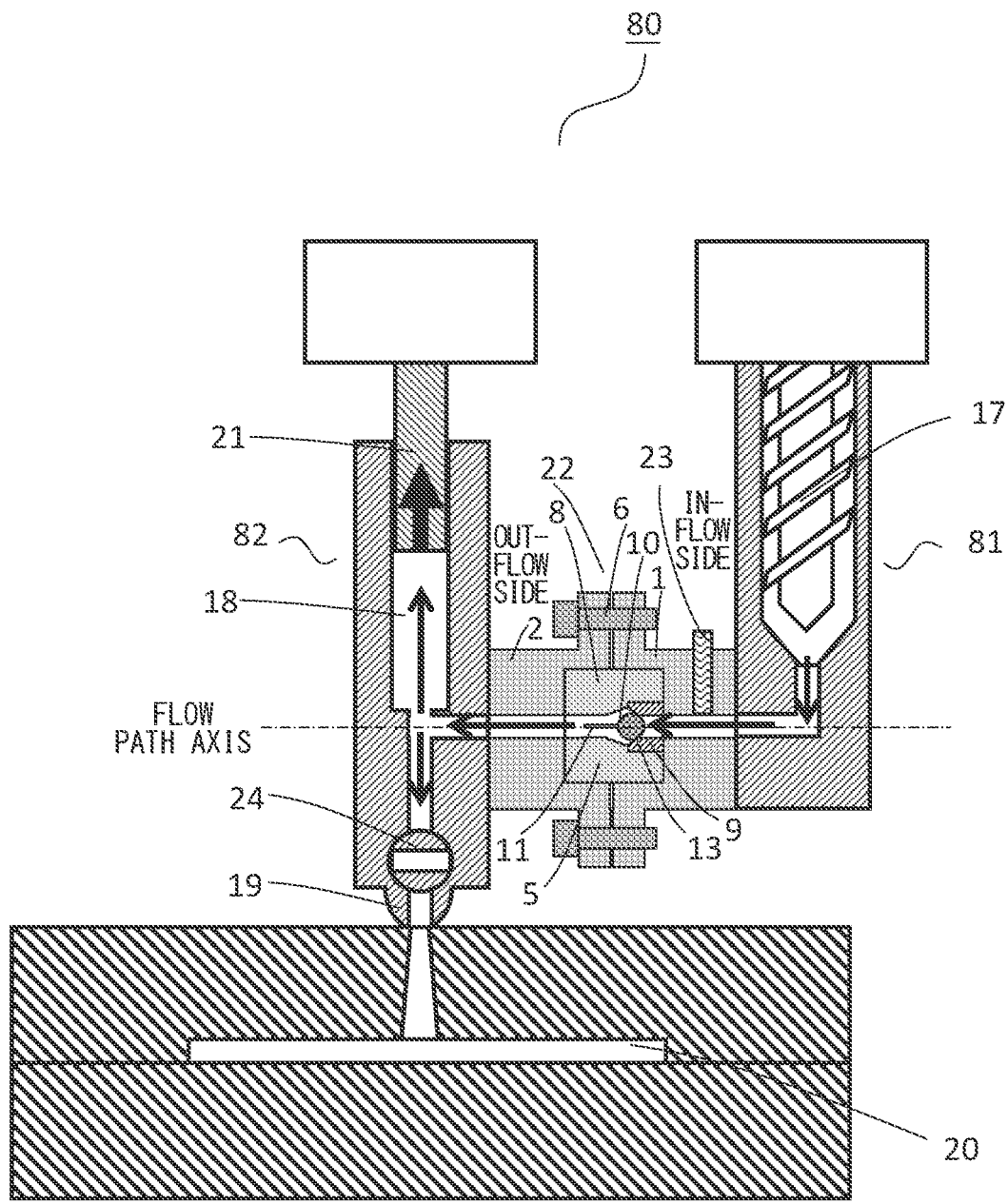
FIG. 8 is a schematic cross-sectional view illustrating a state in which a preplastication type injection molding machine 80 according to a second embodiment performs a metering step.
Figure 9:
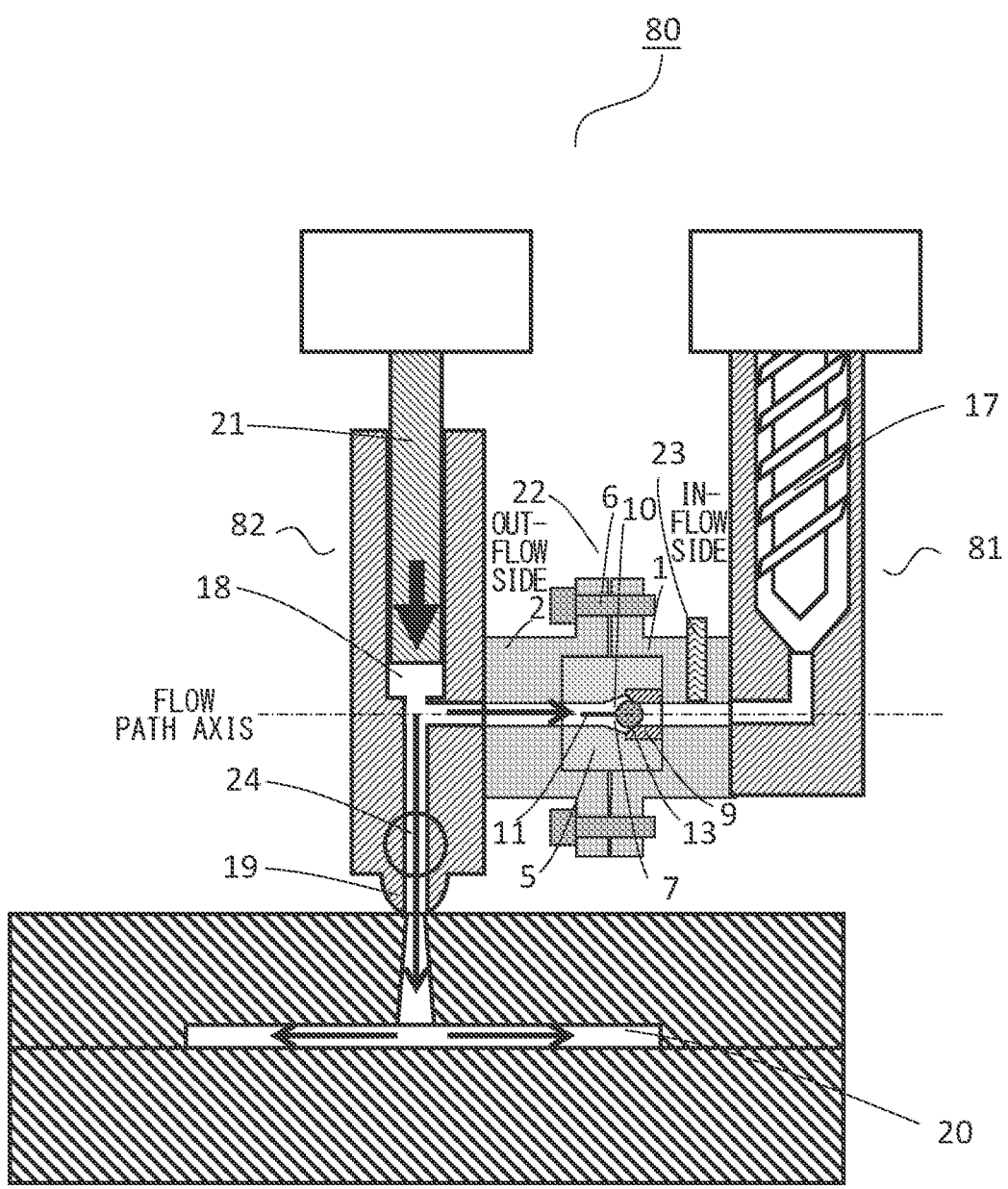
FIG. 9 is a schematic cross-sectional view illustrating a state in which the preplastication type injection molding machine 80 according to the second embodiment performs an injection step and a pressure holding step.

As a second embodiment, the configuration and operation of a preplastication type injection molding machine equipped with the backflow prevention valve described in the first embodiment will be described. FIGS. 8 and 9 are schematic cross-sectional views of the preplastication type injection molding machine equipped with the backflow prevention valve. FIG. 8 illustrates a state in which a preplastication type injection molding machine 80 performs a metering step to be described later, and FIG. 9 illustrates a state in which the preplastication type injection molding machine 80 performs an injection step and a pressure holding step to be described later. In the description of the backflow prevention valve 5 illustrated in the drawings, parts common to the description of the first embodiment will be omitted or simplified.

Configuration of Preplastication Type Molding Machine

The preplastication type injection molding machine 80 includes a molten resin supply unit 81, an injection unit 82, and a mold cavity 20. The molten resin supply unit 81 supplies a molten resin, and the injection unit 82 injects the molten resin. The molten resin supply unit 81 includes a heater (not illustrated) for melting resin pellets as a molding material, and a screw 17 (for example, φ35 mm) for pushing out the molten resin toward the injection unit 82. The injection unit 82 includes a sleeve 18 that stores the molten resin supplied from the molten resin supply unit 81, a plunger 21 (for example, φ20 mm) that can advance or retract in the sleeve 18, a switching valve 24, and a nozzle 19. A tip of the nozzle 19 is connected to a gate of the mold cavity 20 serving as an injection port of molten resin. The switching valve 24 can open and close a hot runner flow path connecting the sleeve 18 and the nozzle 19. A heater (not illustrated) for maintaining the molten resin at an appropriate temperature (for example, 230° C.) is attached to the molten resin supply unit 81 and the injection unit 82.

The molten resin supply unit 81 and the injection unit 82 are connected by a connecting unit 22. The connecting unit 22 includes a first flow path member 1 defining a first section (for example, 8 mm) of the flow path, a backflow prevention valve 5 described in the first embodiment, and a second flow path member 2 defining a second section (for example, φ8 mm) of the flow path. Further, the first flow path member 1 is provided with a pressure sensor 23 for measuring the resin pressure in the flow path. The first flow path member 1 and the second flow path member 2 are made of SUS material, and are provided with a heater (not illustrated) for maintaining the molten resin in the flow path at an appropriate temperature (for example, 230° C.).

The dimensions described with reference to FIGS. 1 and 2 are L1+L2=20 mm and LB=20.03 mm. In a state where TM=0.03 mm is provided as a fastening allowance, the flange portions of the first flow path member 1 and the second flow path member 2 are fastened with 12 bolts 6 (for example, M12).

The housing 8 (for example, cylindrical outer diameter φ30 mm) of the backflow prevention valve 5 is made of SUS material, and a flow path diameter at a position where the flow path cross-sectional area is maximized is set to φ14 mm. The first valve seat portion 9 is formed of high-speed steel having a hardness higher than that of the SUS material of the first flow path member 1, and the diameter of the outer peripheral surface is 18 mm. The first valve seat portion 9 is fitted to the housing 8 by shrinkage fitting. A spherical valve body 10 (for example, φ10 mm) made of cemented carbide (cemented carbide) is inserted into the valve chamber defined by the housing 8 and the first valve seat portion 9.

Molding Process

Next, a molding process using the preplastication type injection molding machine 80 will be described. First, as illustrated in FIG. 8, the metering step is performed in which the switching valve 24 of the injection unit 82 is closed, the plunger 21 is moved by a predetermined distance in an upward direction of the drawing, and a predetermined amount of molten resin is metered and introduced into the sleeve 18. A raw material melted in the molten resin supply unit 81 is extruded from the molten resin supply unit 81 by the screw 17 rotating at 100 rpm. In this case, as described with reference to FIGS. 4A and 4B, in the backflow prevention valve 5, the flow in the forward flow direction is generated so that the backflow prevention valve 5 is opened. The molten resin having passed through the backflow prevention valve 5 is metered by the moving distance of the plunger 21 and stored in the sleeve 18. In this case, a back pressure of 10 MPa is applied to the plunger 21. When the plunger 21 is retracted to the metering set value=100 mm, the metering step is completed.

Next, the injection step and the subsequent pressure holding step will be described with reference to FIG. 9. When the amount of molten resin necessary for molding the resin molded product is stored in the sleeve 18 in the metering step described above, the preplastication type injection molding machine 80 performs the injection step of injecting the molten resin into the mold cavity 20.

In the injection step, as illustrated in FIG. 9, the switching valve 24 is opened to allow the sleeve 18 and the nozzle 19 to communicate with each other, and the plunger 21 is advanced toward the nozzle 19 at 100 mm/s to fill the mold cavity 20 with the molten resin. In this case, a resin pressure of 200 MPa is applied to the valve chamber 7 of the backflow prevention valve 5, and the resin pressure acts in the reverse flow direction with respect to the backflow prevention valve 5 as described with reference to FIGS. 6A and 6B. Therefore, the backflow prevention valve 5 is closed, and backflow of the molten resin to the molten resin supply unit 81 is prevented.

When the filling of the mold cavity 20 with the molten resin is completed, the pressure holding step is performed in which pressure is applied until the resin at the gate portion is solidified (gate seal) so that the molten resin filling the mold cavity 20 does not flow back from the gate and sink or shrink the molded product. In the pressure holding step, the plunger 21 operates in a pressure control mode that controls pressure rather than position. In the pressure holding step, a pressure of 50 MPa is applied over 3 sec. Also, in the pressure holding step, for the backflow prevention valve 5, the pressure on the outflow side> the pressure on the inflow side, and thus, the differential pressure acts in the reverse flow direction. Therefore, the backflow prevention valve 5 is maintained in the closed state, and backflow of the molten resin to the molten resin supply unit 81 is prevented.

When the molten resin filling the mold cavity 20 is solidified, the mold is opened, and then the resin molded product is taken out. Meanwhile, a metering step for performing next injection molding starts and the backflow prevention valve 5 is opened again.

Through the injection step and the pressure holding step, a high pressure of up to 200 MPa is applied to the backflow prevention valve 5 in the closed state. However, even when the injection molding is repeatedly performed many times, resin leakage does not occur in the connecting unit 22 in the preplastication type injection molding machine 80 of the present embodiment having excellent durability of the backflow prevention valve.

In the present embodiment, whether the backflow prevention valve 5 is normally opened or closed can be confirmed using the pressure sensor 23. In the injection step and the pressure holding step, when the backflow prevention valve 5 is appropriately closed, the high pressure state on the outflow side (plunger side) does not propagate to the first section of the flow path. When the pressure sensor 23 detects an abnormal pressure increase, it can be inferred that a failure has occurred in the backflow prevention valve 5. In this case, in the preplastication type injection molding machine 80 of the present embodiment, the backflow prevention valve can be easily removed from the flow path member by detaching the fastening member (bolt), and the backflow prevention valve can be easily replaced. As described above, the load required for maintenance of the injection molding machine can be suppressed.

Third Embodiment

As a third embodiment, configuration and operation of a family molding apparatus equipped with the backflow prevention valve described in the first embodiment will be described. The family molding apparatus is an injection molding apparatus, and includes a manufacturing unit such as a multi-piece mold having different shapes. The injection molding machine used in the family molding apparatus of the present embodiment is an in-line screw type, and can perform plasticization, injection, and metering of a molding material by rotation, advancement, and retraction of a screw as described later.

Figure 10:
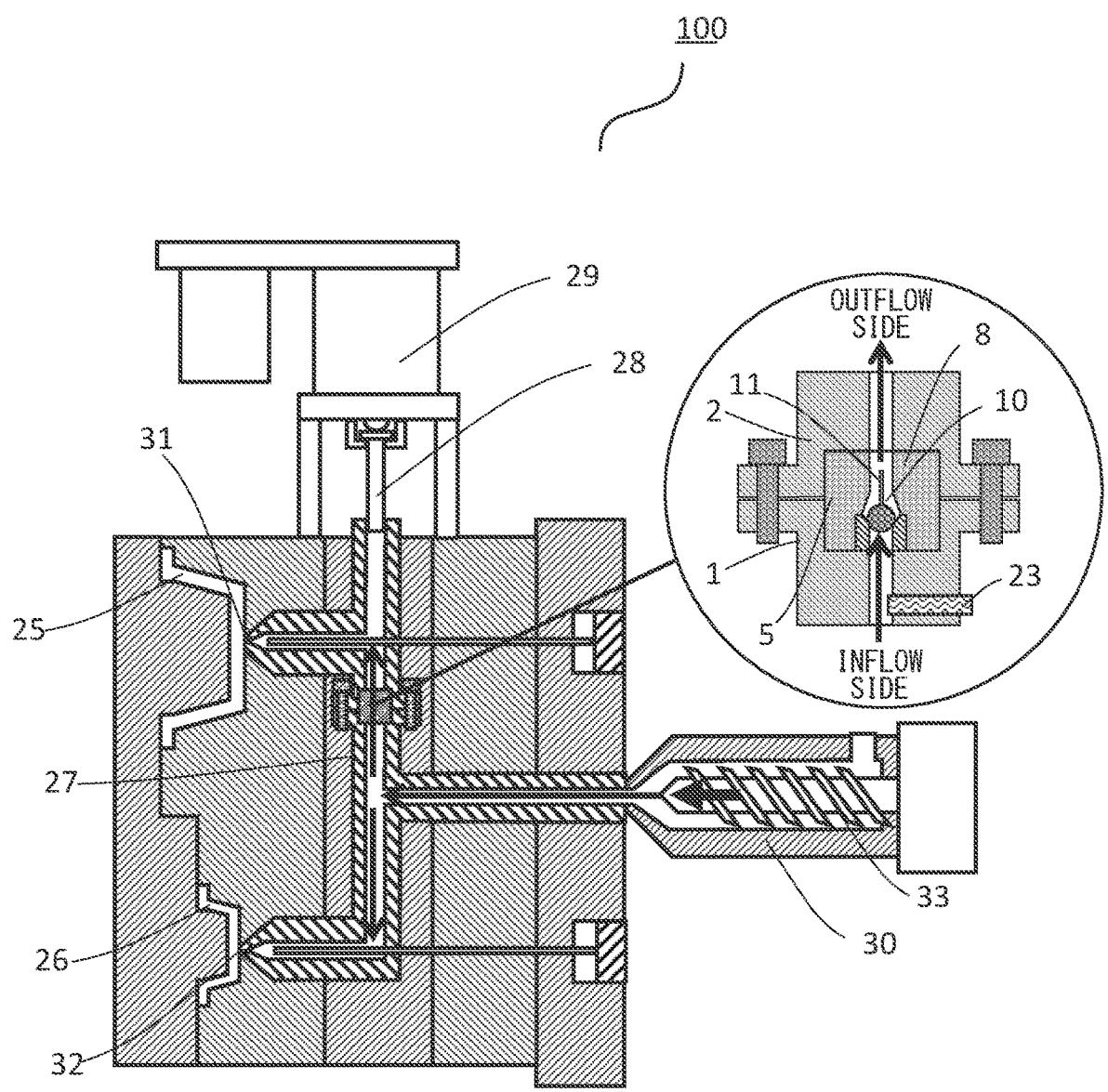
FIG. 10 is a schematic cross-sectional view illustrating a state in which a family molding apparatus 100 according to a third embodiment performs an injection step.
Figure 11:
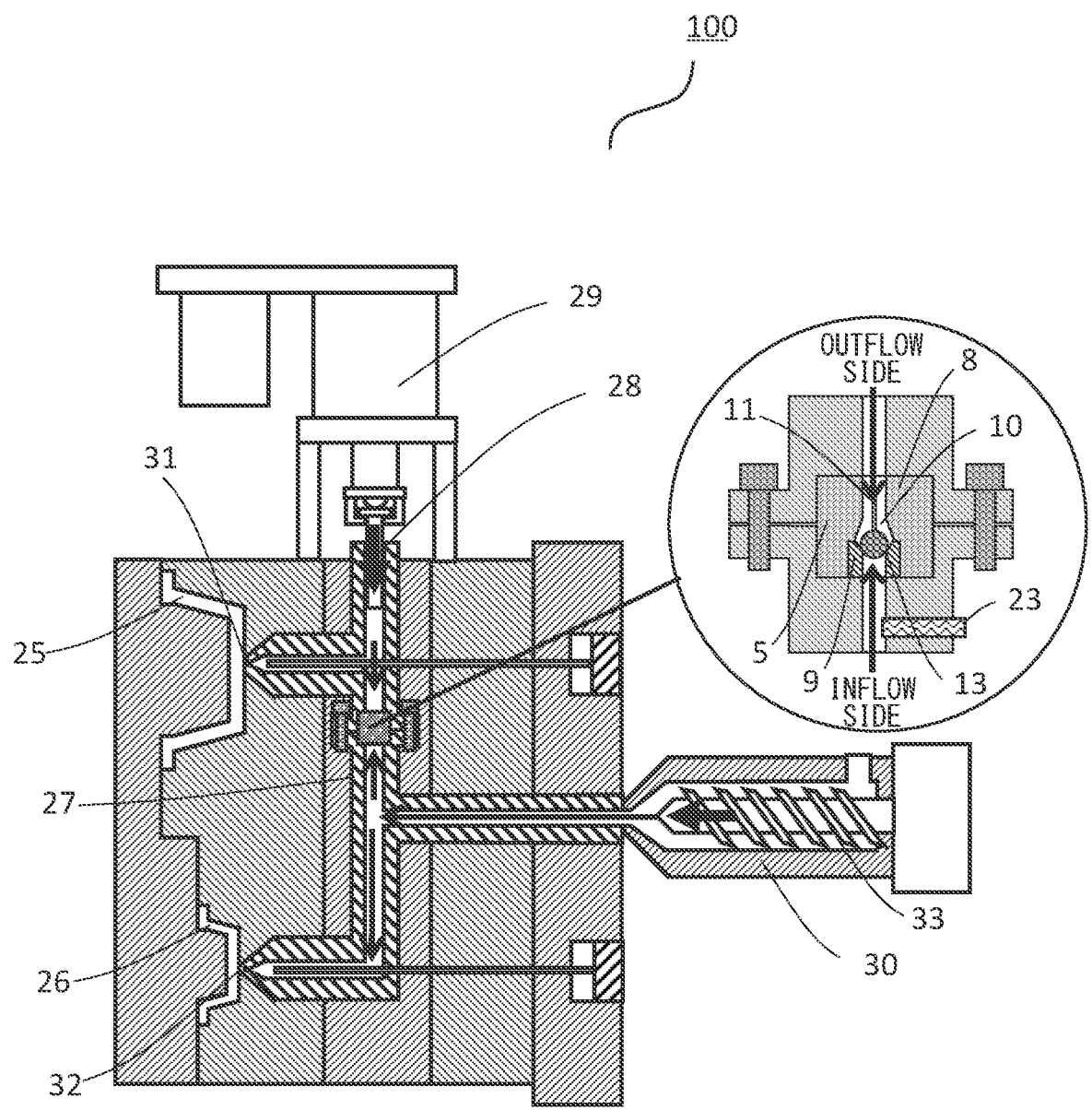
FIG. 11 is a schematic cross-sectional view illustrating a state in which the family molding apparatus 100 according to the third embodiment performs a pressure holding step.
Figure 12:
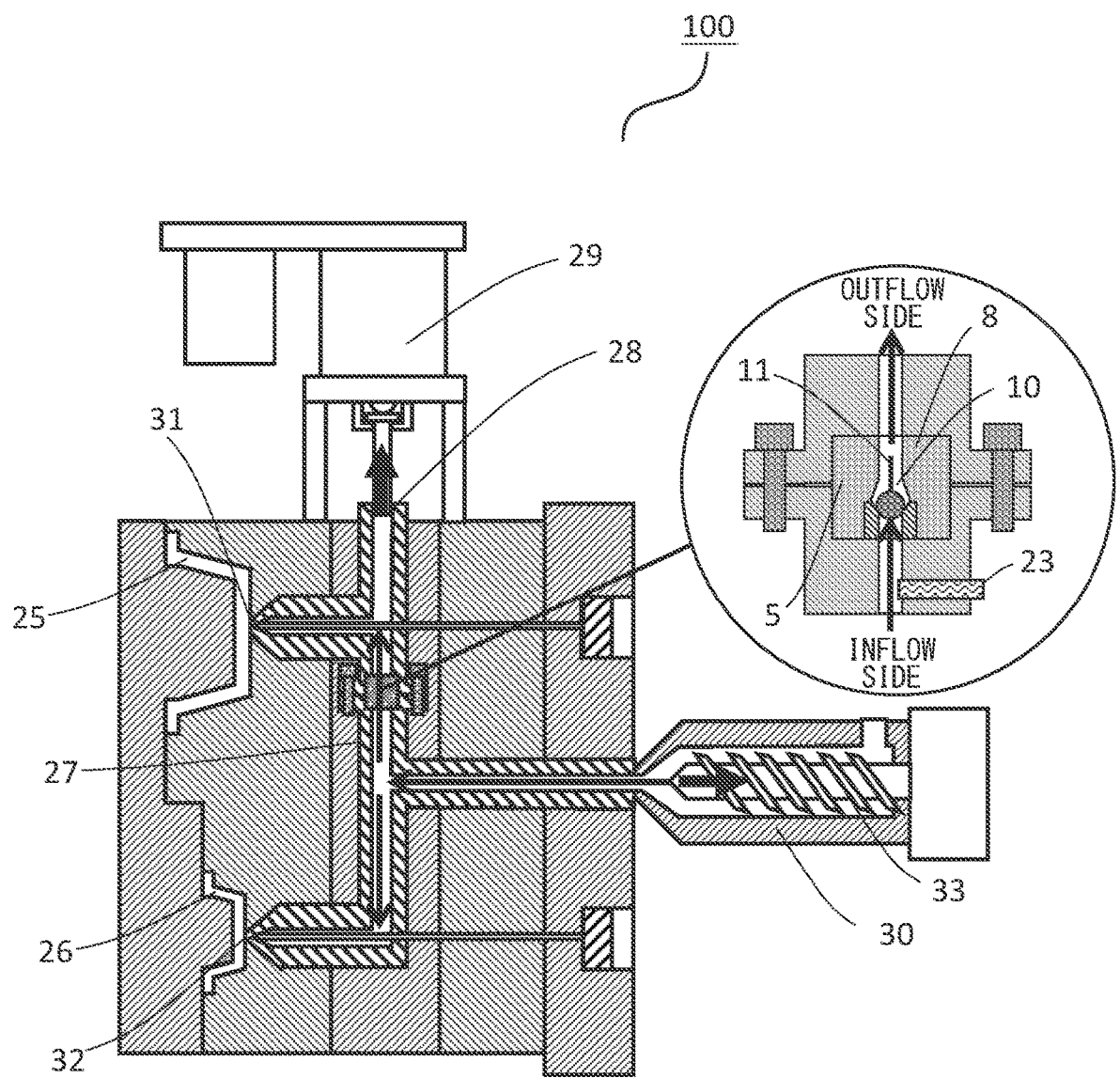
FIG. 12 is a schematic cross-sectional view illustrating a state in which the family molding apparatus 100 according to the third embodiment performs a metering step.

FIGS. 10 to 12 are schematic cross-sectional views of a family molding apparatus 100 equipped with a backflow prevention valve 5. FIG. 10 illustrates a state in which the family molding apparatus 100 performs an injection step to be described later, FIG. 11 illustrates a state in which the family molding apparatus 100 performs a pressure holding step to be described later, and FIG. 12 illustrates a state in which the family molding apparatus 100 performs a metering step to be described later. In the description of the backflow prevention valve 5 illustrated in the drawings, parts common to the description of the first embodiment will be omitted or simplified.

Configuration of Family Molding Apparatus

The family molding apparatus 100 includes a molten resin supply unit 30 and a manufacturing unit, and the manufacturing unit includes a first cavity 25, a second cavity 26, a hot runner 27, a plunger 28, and a pressure control device 29 that drives the plunger 28. The first cavity 25 and the second cavity 26 are cavities for molding resin molded products having different shapes, and an inner volume of the first cavity 25 is larger than that of the second cavity 26. A molten resin is supplied from the molten resin supply unit 30 to the first cavity 25 and the second cavity 26 via the manifold-shaped hot runner 27. An openable and closable first gate valve 31 is provided at a tip of an injection nozzle on the first cavity 25 side, and an openable and closable second gate valve 32 is provided at a tip of an injection nozzle on the second cavity 26 side.

The backflow prevention valve 5 described in the first embodiment is mounted in the flow path branched from the molten resin supply unit 30 side to the first cavity 25 side in the hot runner 27 in a direction in which the molten resin supply unit 30 is on the inflow side. That is, the backflow prevention valve 5 is mounted such that the direction from the molten resin supply unit 30 toward the first cavity 25 is the forward flow direction. The backflow prevention valve 5 is sandwiched between a first flow path member 1 and a second flow path member 2 constituting the hot runner 27, and as illustrated in FIG. 1, the first flow path member 1 and the second flow path member 2 are fastened by bolts. Further, the first flow path member 1 is provided with a pressure sensor 23 for measuring the resin pressure in the flow path. The first flow path member 1 and the second flow path member 2 are made of SUS material, and are provided with a heater (not illustrated) for maintaining the molten resin in the flow path at an appropriate temperature (for example, 230° C.).

The dimensions described with reference to FIGS. 1 and 2 are L1+L2=35 mm and LB=35.03 mm. In a state where TM=0.03 mm is provided as a fastening allowance, the flange portions of the first flow path member 1 and the second flow path member 2 are fastened with 12 bolts 6 (for example, M12).

A housing 8 (for example, cylindrical outer peripheral diameter φ30 mm) of the backflow prevention valve 5 is made of SUS material, and a flow path diameter at the position where the flow path cross-sectional area is maximized is set to φ14 mm. The first valve seat portion 9 is formed of high-speed steel having a hardness higher than that of the SUS material of the first flow path member 1, and the diameter of the outer peripheral surface is 18 mm. The first valve seat portion 9 is fitted to the housing 8 by shrinkage fitting. A spherical valve body 10 (for example, φ10 mm) made of cemented carbide (cemented carbide) is inserted into the valve chamber defined by the housing 8 and the first valve seat portion 9.

Molding Process

Next, a molding process using the family molding apparatus 100 will be described. In the present embodiment, in the injection step, the first cavity 25 and the second cavity 26 are substantially simultaneously filled with the molten resin from the molten resin supply unit 30. In the subsequent pressure holding step, different suitable pressures are applied to the first cavity 25 and the deformed second cavity 26 different from each other. That is, the holding pressure is applied from the plunger 28 driven by the pressure control device 29 to the first cavity 25 having a large inner volume and a large appropriate holding pressure. Meanwhile, the holding pressure is applied from the screw 33 of the molten resin supply unit 30 to the second cavity 26 having a small inner volume and a small appropriate holding pressure. In the pressure holding step, since the backflow prevention valve 5 is closed, an appropriate pressure can be applied to each of the first cavity 25 and the second cavity 26 without causing the molten resin to flow backward.

First, the injection step will be described with reference to a schematic cross-sectional view of FIG. 10. In the injection step, first, in a state where the second gate valve 32 connected to the second cavity is closed, the first gate valve 31 connected to the first cavity 25 is opened, and the screw 33 of the molten resin supply unit 30 is advanced at 50 mm/s. A predetermined amount of the molten resin stored in the molten resin supply unit 30 is pushed out to the flow path of the hot runner 27 by the advancing screw 33, but the molten resin flows toward the first cavity 25 since the second gate valve 32 is closed. Since this flow is in the forward flow direction to the backflow prevention valve 5 as described with reference to FIGS. 4A and 4B, the backflow prevention valve 5 is opened, and the first cavity 25 is filled with the molten resin. It is possible to grasp the amount of resin filling the first cavity 25 by examining in advance a relationship between an advance amount of the screw 33 and an amount of molten resin supplied to the hot runner 27. For example, when the inner volume of the first cavity is 60 cm³ and the inner volume of the second cavity is 30 cm³, the second gate valve 32 is controlled to open at the timing when the unfilled volume of the first cavity becomes 30 cm³. Thereafter, since both cavities are fed with molten resin in parallel, filling can be completed almost simultaneously.

Next, the pressure holding step will be described with reference to a schematic cross-sectional view of FIG. 11. In the pressure holding step, the pressure is held in the flow path of the hot runner 27 using the plunger 28 of φ14 under the control of the pressure control device 29. Specifically, a holding pressure of 80 MPa is applied to the hot runner flow path for 3 sec. Meanwhile, a pressure is applied to the flow path of the hot runner 27 using the screw 33 of the molten resin supply unit 30. Specifically, a holding pressure of 50 MPa is applied to the flow path of the hot runner 27 for 3 sec.

In this case, for the backflow prevention valve 5, since the outflow-side pressure> the inflow-side pressure, the difference in the flow pressure acts in the reverse flow direction as described with reference to FIGS. 6A and 6B. Therefore, the backflow prevention valve 5 is closed to prevent backflow of the molten resin toward the molten resin supply unit 81. The holding pressure of 80 MPa applied from the plunger 28 is applied to the first cavity, and the holding pressure of 50 MPa applied by the screw 33 is applied to the second cavity 26. As described above, in the present embodiment, since the backflow prevention valve 5 is closed, it is possible to simultaneously apply different holding pressures suitable for the respective cavities. When the pressure holding step is completed, the first gate valve 31 and the second gate valve 32 are closed, and the metering step is started as preparation for the next injection molding.

Next, the metering step will be described with reference to a schematic cross-sectional view of FIG. 12. In the metering step, the position of the screw 33 of the molten resin supply unit 30 and the position of the plunger 28 are reset to the start position of the injection step, and a predetermined amount of molten resin required in the next injection step is stored in the molten resin supply unit 30. In this case, the screw 33 is rotated at 100 rpm to apply a back pressure of 10 MPa, and the plunger 28 is retracted at 50 mm/s. The outflow side pressure of the backflow prevention valve 5 is forcibly depressurized to 0 MPa, while the inflow side pressure is 10 MPa. Therefore, as described with reference to FIGS. 4A and 4B, the differential pressure in the forward flow direction is generated in the backflow prevention valve 5, the backflow prevention valve 5 is opened, and the metering step can be performed without any trouble. When the resin in the cavity is solidified after a cooling time elapses, the mold is opened, and the respective resin molded products are taken out from the first cavity 25 and the second cavity 26. After the removal and metering are completed, the process proceeds to the injection step again.

In the present embodiment, through the pressure holding step, a high pressure of a holding pressure of 80 MPa is applied to the backflow prevention valve 5 in the valve closed state. However, even when the injection molding is repeatedly performed many times, in the family molding apparatus 100 of the present embodiment, resin leakage does not occur at the connecting unit between the backflow prevention valve 5 and the flow path component (the first flow path member 1 and the second flow path member 2), and appropriate holding pressure is performed.

In the present embodiment, whether the backflow prevention valve 5 is normally opened or closed can be confirmed using the pressure sensor 23. In the pressure holding step, when the backflow prevention valve 5 is appropriately closed, the high pressure state on the outflow side (plunger side) does not propagate to the first section of the flow path. When the pressure sensor 23 detects an abnormal pressure increase, it can be inferred that a failure has occurred in the backflow prevention valve 5. In this case, in the family molding apparatus 100 of the present embodiment, the backflow prevention valve can be easily removed from the flow path member by detaching the fastening member (bolt), and the backflow prevention valve can be easily replaced. In this manner, it is possible to suppress a load required for maintenance of the manufacturing unit.

Fourth Embodiment

Figure 13A:
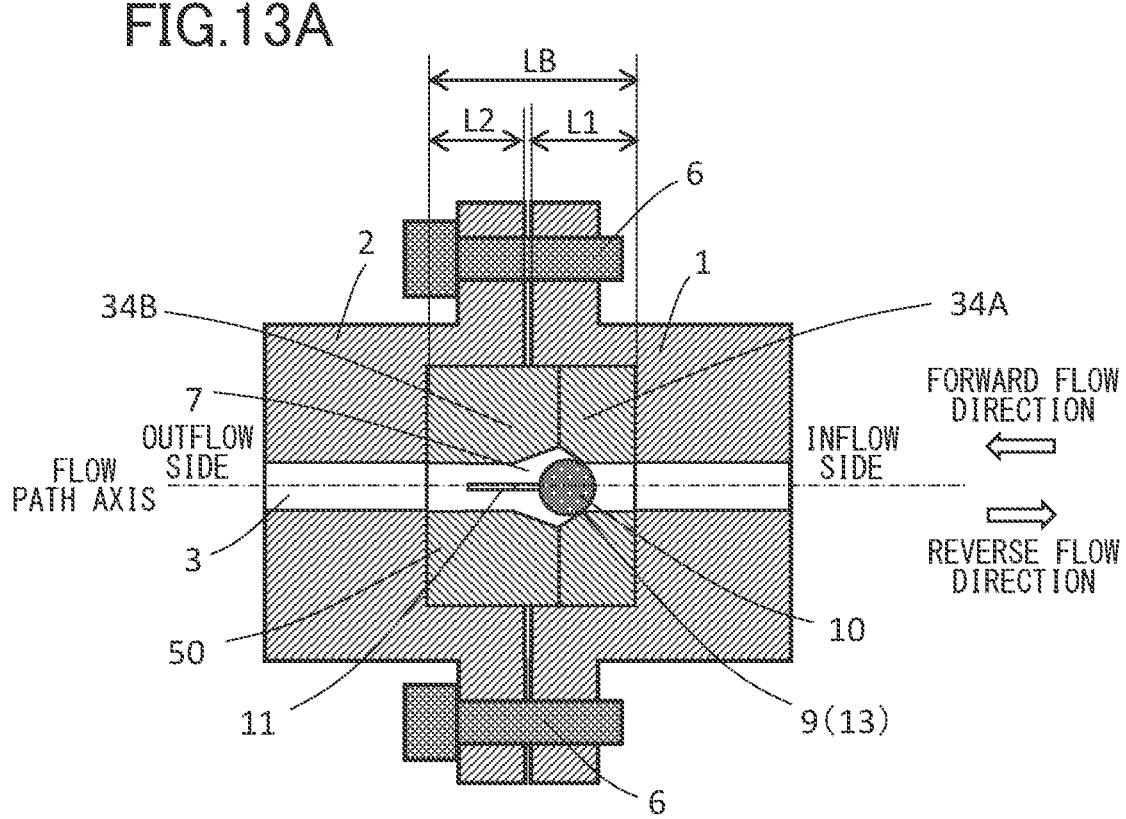
FIG. 13A is a schematic cross-sectional view illustrating a state in which a backflow prevention valve 50 according to a fourth embodiment is mounted in a flow path of a molten resin.

A backflow prevention valve 50 according to a fourth embodiment, a method of mounting the backflow prevention valve in a flow path of a molten resin, and the like will be described with reference to a schematic cross-sectional view of FIG. 13A. The backflow prevention valve 50 of the present embodiment is different in configuration from the backflow prevention valve 5 of the first embodiment. In the backflow prevention valve 5 of the first embodiment, the housing 8 is formed of, for example, SUS material, and includes the second valve seat portion 11. The first valve seat portion 9 formed of a material (for example, high-speed steel) having hardness higher than that of the first flow path member 1 (for example, SUS material) is mounted on the inflow side of the housing 8.

In the backflow prevention valve of the fourth embodiment, the housing includes a housing member 34A on an inflow side and the housing member 34B on an outflow side. The housing is divided into the housing member 34A and the housing member 34B at a position where a flow path cross-sectional area of a valve chamber 7 is maximized, and an abutment surface between the housing member 34A and the housing member 34B is orthogonal to a flow path axial direction. However, depending on a pressure of a molten resin in the valve chamber 7, the division position may not coincide with the position where the flow path cross-sectional area is maximized. A first valve seat portion 9 (conical surface shape portion 13) is formed in the housing member 34A, and a second valve seat portion 11 (protrusion) is formed in the housing member 34B.

Assuming that the first flow path member 1 and the second flow path member 2 are made of, for example, SUS material, in the present embodiment, the housing member 34A and the housing member 34B are made of a material (for example, high-speed steel) having higher hardness than that of the flow path member. The dimensional relationship satisfying L1+L2<LB is the same as that in the first embodiment.

According to the present embodiment, the first valve seat portion 9 with which the valve body 10 contacts with a strong force when preventing backflow is formed of a material having hardness higher than that of the first flow path member. The second valve seat portion 11 with which the valve body 10 is in contact during forward flow is formed of a material having a hardness higher than that of the second flow path member. Therefore, the durability of the backflow prevention valve 50 is improved, and the backflow prevention valve can be stably operated for a long period of time.

In addition, the first flow path member 1 and the second flow path member 2 are firmly fastened by the bolt 6 in a state where the first flow path member 1 and the second flow path member 2 sandwich the backflow prevention valve 50, and the first flow path member 1 and the second flow path member 2 are separated from each other via the fastening allowance of the bolt 6. With the structure capable of exerting a strong fastening force, the first flow path member 1 and the backflow prevention valve 50, and the second flow path member 2 and the backflow prevention valve 50 are in close contact with (abut on) each other with a strong force, and leaking of the molten resin from the gap is suppressed.

According to the present embodiment, since sufficient sealing can be realized without joining the flow path member and the backflow prevention valve by brazing or the like, mounting of the backflow prevention valve is easy. In addition, even in the case of replacing the backflow prevention valve, the backflow prevention valve can be easily removed from the flow path member by removing the fastening member (bolt), and the load required for maintenance of the manufacturing apparatus such as the injection molding machine or the manufacturing unit can be greatly reduced.

Fifth Embodiment

Figure 13B:
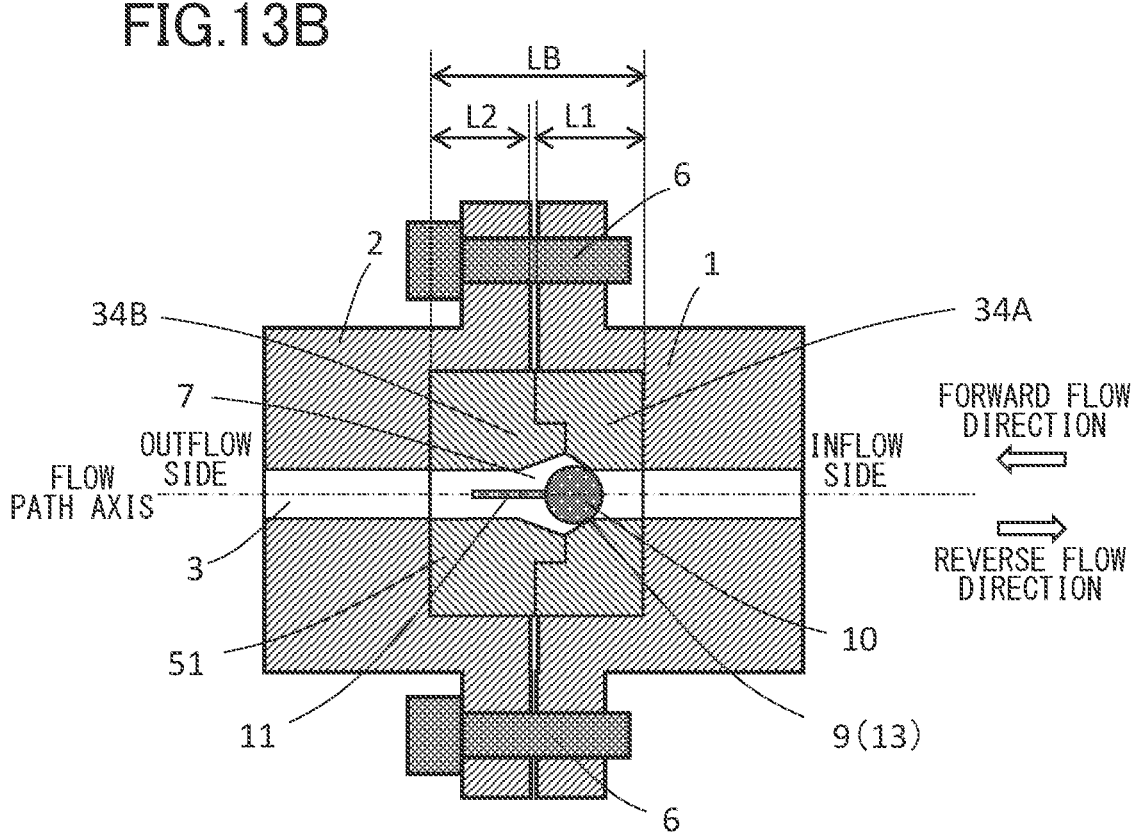
FIG. 13B is a schematic cross-sectional view illustrating a state in which a backflow prevention valve 51 according to a fifth embodiment is mounted in a flow path of a molten resin.

A backflow prevention valve 51 as a modification of the fourth embodiment will be described with reference to a schematic cross-sectional view of FIG. 13B. The fourth embodiment is different from the present embodiment in shapes of abutment surfaces of the housing member 34A and the housing member 34B. In the fourth embodiment, the abutment surface between the housing member 34A and the housing member 34B is a plane orthogonal to the flow path axial direction, but in the present embodiment, the abutment surface has a stepped shape.

Before mounting the backflow prevention valve on a manufacturing apparatus such as an injection molding machine or a manufacturing unit, it is convenient to handle the housing member 34A, the housing member 34B, and the valve body 10 as an integrated valve unit instead of handling them separately as individual portions. According to the present embodiment, since the housing member 34A and the housing member 34B can be fitted to each other by the step shape and can be assembled as a valve unit, handling is easy and work at the time of being mounted on a molten resin flow path of an injection machine or the like is easy.

Sixth Embodiment

Figure 14:
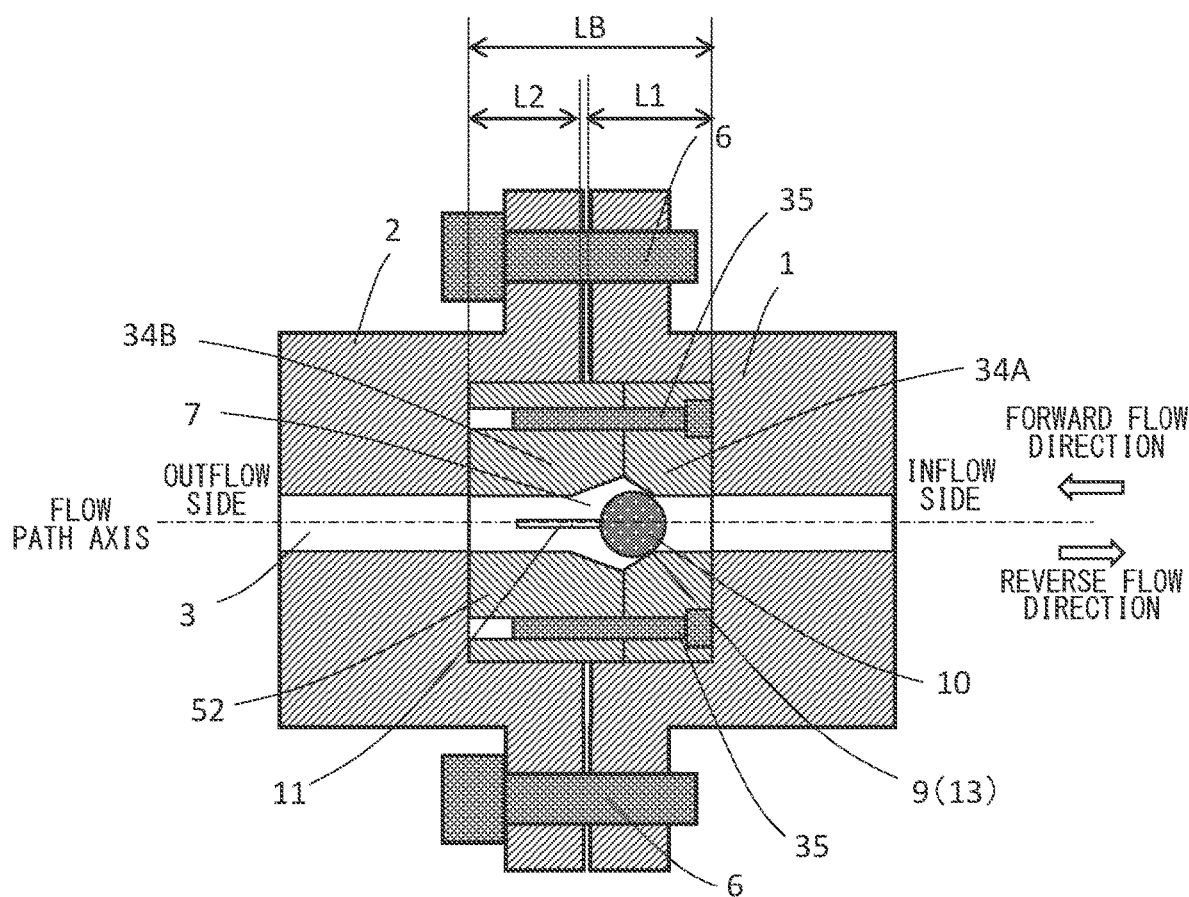
FIG. 14 is a schematic cross-sectional view illustrating a state in which a backflow prevention valve 52 according to a sixth embodiment is mounted in a flow path of a molten resin.

A backflow prevention valve 52 that is a modification of the fourth embodiment will be described with reference to a schematic cross-sectional view of FIG. 14. In the fourth embodiment and the present embodiment, the shapes of the abutment surfaces of the housing member 34A and the housing member 34B are the same, but in the present embodiment, a through hole is provided in the housing member 34A and the housing member 34B, and the housing member and the housing member are fastened to each other by a bolt 35 which is a fastening member.

Before mounting the backflow prevention valve on a manufacturing apparatus such as an injection molding machine or a manufacturing unit, it is convenient to handle the housing member 34A, the housing member 34B, and the valve body 10 as an integrated valve unit instead of handling them separately as individual portions. According to the present embodiment, since the housing member 34A and the housing member 34B can be fastened by the bolt 35 and can be assembled as a valve unit, handling is convenient, and mounting work on a molten resin flow path of an injection machine or the like is easy.

Seventh Embodiment

Figure 15:
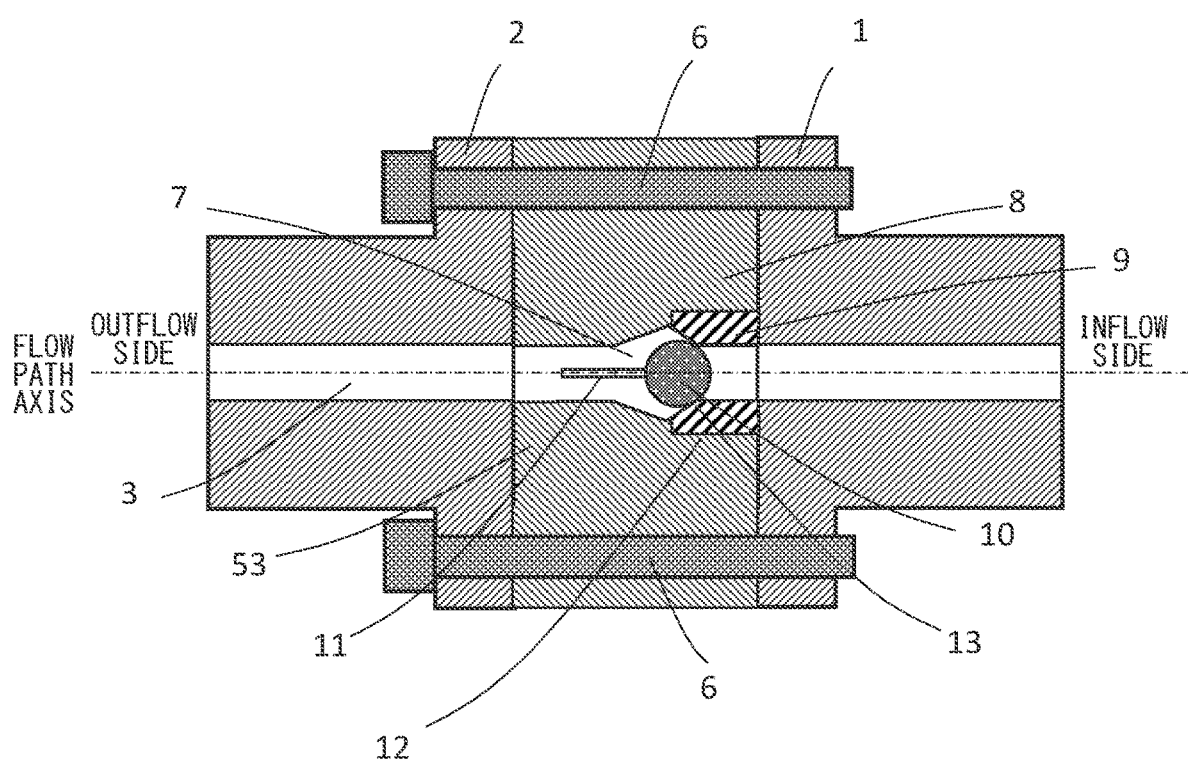
FIG. 15 is a schematic cross-sectional view illustrating a state in which a backflow prevention valve 53 according to a seventh embodiment is mounted in a flow path of a molten resin.

A backflow prevention valve 53 according to a modification of the first embodiment will be described with reference to a schematic cross-sectional view of FIG. 15. Similarly to the backflow prevention valve 5 of the first embodiment, in the backflow prevention valve 53 of the present embodiment, a housing 8 is formed of, for example, SUS material, and the housing 8 includes a second valve seat portion 11. A first valve seat portion 9 formed of a material (for example, high-speed steel) having hardness higher than that of a first flow path member 1 (for example, SUS material) is fitted to an inflow side of the housing 8.

A difference from the first embodiment is that a through hole is provided in the housing 8, and a bolt 6, which is a fastening member, passes through the through hole and is fastened in a state where the backflow prevention valve 53 is sandwiched between the first flow path member 1 and the second flow path member 2.

Also in the present embodiment, since the first valve seat portion 9 with which the valve body 10 contacts with a strong force when preventing the backflow is formed of a material having a hardness higher than that of the first flow path member, durability of the backflow prevention valve 5 is improved, and the backflow prevention valve 5 can be stably operated for a long period of time.

In addition, according to the present embodiment, since sufficient sealing can be realized by the fastening member without joining the flow path member and the backflow prevention valve by brazing or the like, it is easy to mount the backflow prevention valve. In addition, even in the case of replacing the backflow prevention valve, the backflow prevention valve can be easily removed from the flow path member by removing the fastening member (bolt), and the load required for maintenance of the manufacturing apparatus such as the injection molding machine or the manufacturing unit can be greatly reduced.

Eighth Embodiment

Figure 16:
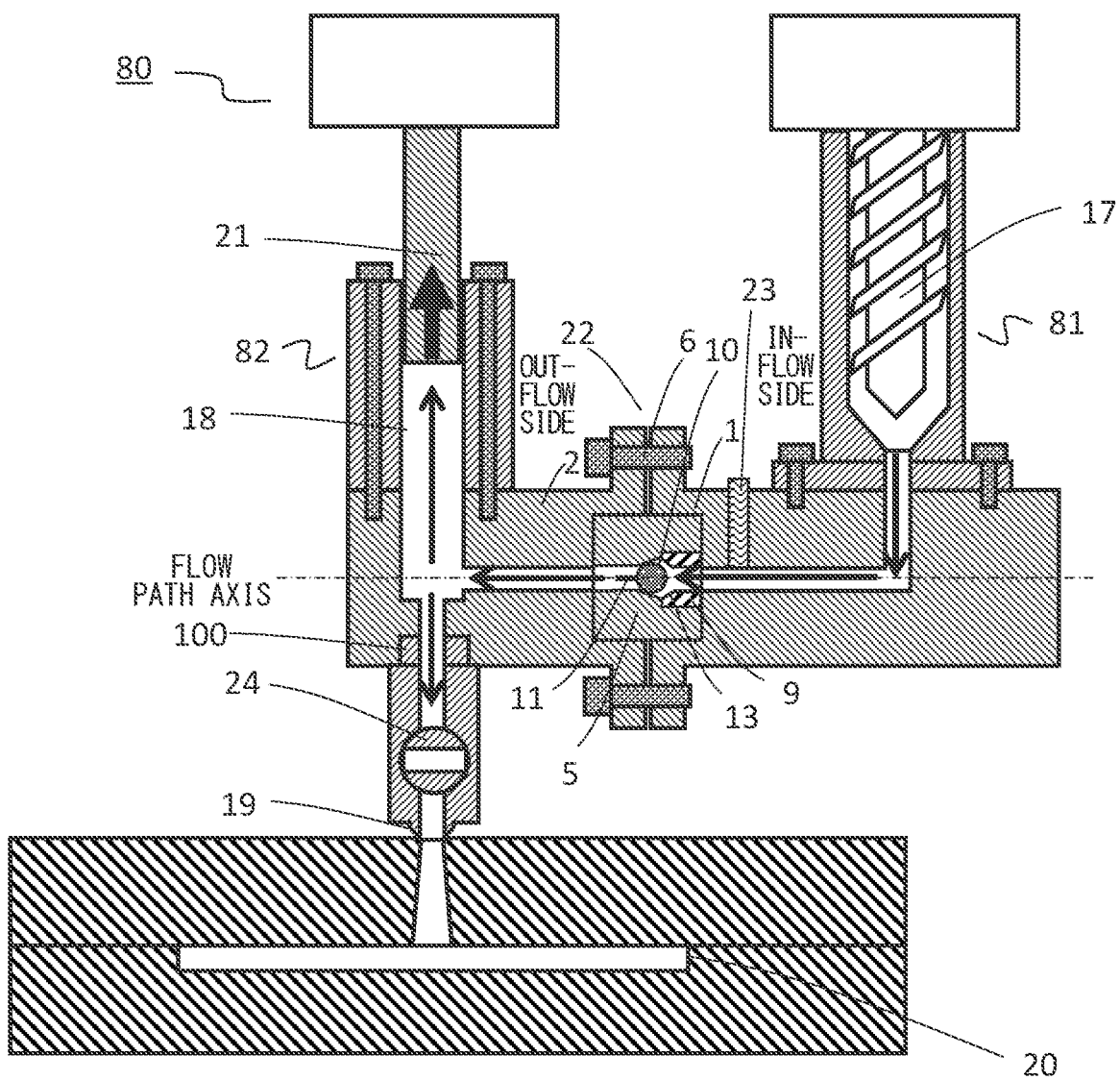
FIG. 16 is a schematic cross-sectional view of a preplastication type injection molding machine according to an eighth embodiment.

The detailed configuration of a preplastication type injection device equipped with the backflow prevention valve described in the second embodiment will be described. FIG. 16 is a schematic cross-sectional view of a preplastication type injection molding machine equipped with a backflow prevention valve. FIG. 16 illustrates a state in which a preplastication type injection molding machine 80 performs a metering step described later. In the description of the backflow prevention valve 5 illustrated in the drawings, parts common to the description of the first embodiment will be omitted or simplified.

Configuration of Preplastication Type Molding Machine

The preplastication type injection molding machine 80 includes a molten resin supply unit 81, an injection unit 82, and a mold cavity 20. The molten resin supply unit 81 includes a heater (not illustrated) for melting resin pellets as a molding material, and a screw 17 (for example, $\varphi$35 mm) for pushing out the molten resin toward the injection unit 82. The injection unit 82 includes a sleeve 18 that stores the molten resin supplied from the molten resin supply unit 81, a plunger 21 (for example, $\varphi$20 mm) that can advance or retract in the sleeve 18, a switching valve 24, and a nozzle 19. A tip of the nozzle 19 is connected to a gate of the mold cavity 20 serving as an injection port of molten resin. The switching valve 24 can open and close a hot runner flow path connecting the sleeve 18 and the nozzle 19. A heater (not illustrated) for maintaining the molten resin at an appropriate temperature (for example, 230° C.) is attached to the molten resin supply unit 81 and the injection unit 82.

The connecting unit 22 includes a first flow path member 1 defining a first section (for example, $\varphi$8 mm) of the flow path, a backflow prevention valve 5 described in the first embodiment, and a second flow path member 2 defining a second section (for example, $\varphi$8 mm) of the flow path. Further, the first flow path member 1 is provided with a pressure sensor 23 for measuring the resin pressure in the flow path. The first flow path member 1 and the second flow path member 2 are made of SUS material, and are provided with a heater (not illustrated) for maintaining the molten resin in the flow path at an appropriate temperature (for example, 230° C.).

The backflow prevention valve 5 is sandwiched by the connecting unit 22. The molten resin supply unit 81 is attached to the first flow path member 1 by bolt fastening. The injection unit 82 is attached to the second flow path member 2 by bolt fastening. Further, the nozzle 19 is formed with a screw portion, and is attached by being tightened in a screw hole formed in the second flow path member 2.

When the backflow prevention valve 5 is replaced, the first flow path member 1 and the molten resin supply unit 81 are separated in a direction (up-down direction in FIG. 16) in which the first flow path member 1 and the molten resin supply unit 81 are arranged. In addition, the second flow path member 2 and the injection unit 82 are separated in a direction (up-down direction in FIG. 16) in which the second flow path member 2 and the injection unit 82 are arranged. In this manner, the molten resin supply unit 81, the injection unit 82, and the nozzle 19 are removed from the first flow path member 1 and the second flow path member 2. Thereafter, the bolt of the connecting unit 22 is removed, and the first flow path member 1 and the second flow path member 2 are separated in a direction (right-left direction in FIG. 16) in which the first flow path member 1 and the second flow path member 2 are arranged. As a result, the backflow prevention valve 5 can be removed from between the first flow path member 1 and the second flow path member 2. The dimensions described with reference to FIGS. 1 and 2 are L1+L2=20 mm and LB=20.03 mm. In a state where TM=0.03 mm is provided as a fastening allowance, the flange portions of the first flow path member 1 and the second flow path member 2 are fastened with 12 bolts 6 (for example, M12).

The housing 8 (for example, cylindrical outer diameter $\varphi$30 mm) of the backflow prevention valve 5 is made of SUS material, and a flow path diameter at a position where the flow path cross-sectional area is maximized is set to $\varphi$14 mm. The first valve seat portion 9 is formed of high-speed steel having a hardness higher than that of the SUS material of the first flow path member 1, and the diameter of the outer peripheral surface is 18 mm. The first valve seat portion 9 is fitted to the housing 8 by shrinkage fitting. A spherical valve body 10 (for example, φ10 mm) made of cemented carbide (cemented carbide) is inserted into the valve chamber defined by the housing 8 and the first valve seat portion 9.

Assuming that the molten resin supply unit 81 is referred to as a first component and the injection unit 82 is referred to as a second component, the present embodiment has the following characteristic configuration. The first component is detachably connected to the first flow path member 1, and the second component is detachably connected to the second flow path member 2. The attachment/detachment direction (up-down direction in FIG. 16) of the first flow path member 1 and the first component member intersects with the direction (right-left direction in FIG. 16) in which the first flow path member 1 and the second flow path member 2 are arranged. The attachment/detachment direction (up-down direction in FIG. 16) of the second flow path member 2 and the second component member intersects with the direction (right-left direction in FIG. 16) in which the first flow path member 1 and the second flow path member 2 are arranged. In this way, for example, there are advantages that miniaturization of the device can be realized, assembly and disassembly of the device (attachment and detachment of members) can be facilitated, and a space required for assembly and disassembly of the device can be omitted. At least one of the attachment/detachment direction of the first flow path member 1 and the first component and the attachment/detachment direction of the second flow path member 2 and the second component can be the same as the direction in which the first flow path member 1 and the second flow path member 2 are arranged. However, when the four members of the first component, the first flow path member 1, the second flow path member 2, and the second component are arranged in a line, the above-described advantages can be impaired.

Ninth Embodiment

A detailed configuration of the family molding apparatus equipped with the backflow prevention valve described in the first embodiment will be described. The family molding apparatus is an injection molding apparatus, and includes a manufacturing unit such as a multi-piece mold having different shapes. The injection molding machine used in the family molding apparatus of the present embodiment is an in-line screw type, and can perform plasticization, injection, and metering of a molding material by rotation, advancement, and retraction of a screw as described later.

Figure 17:
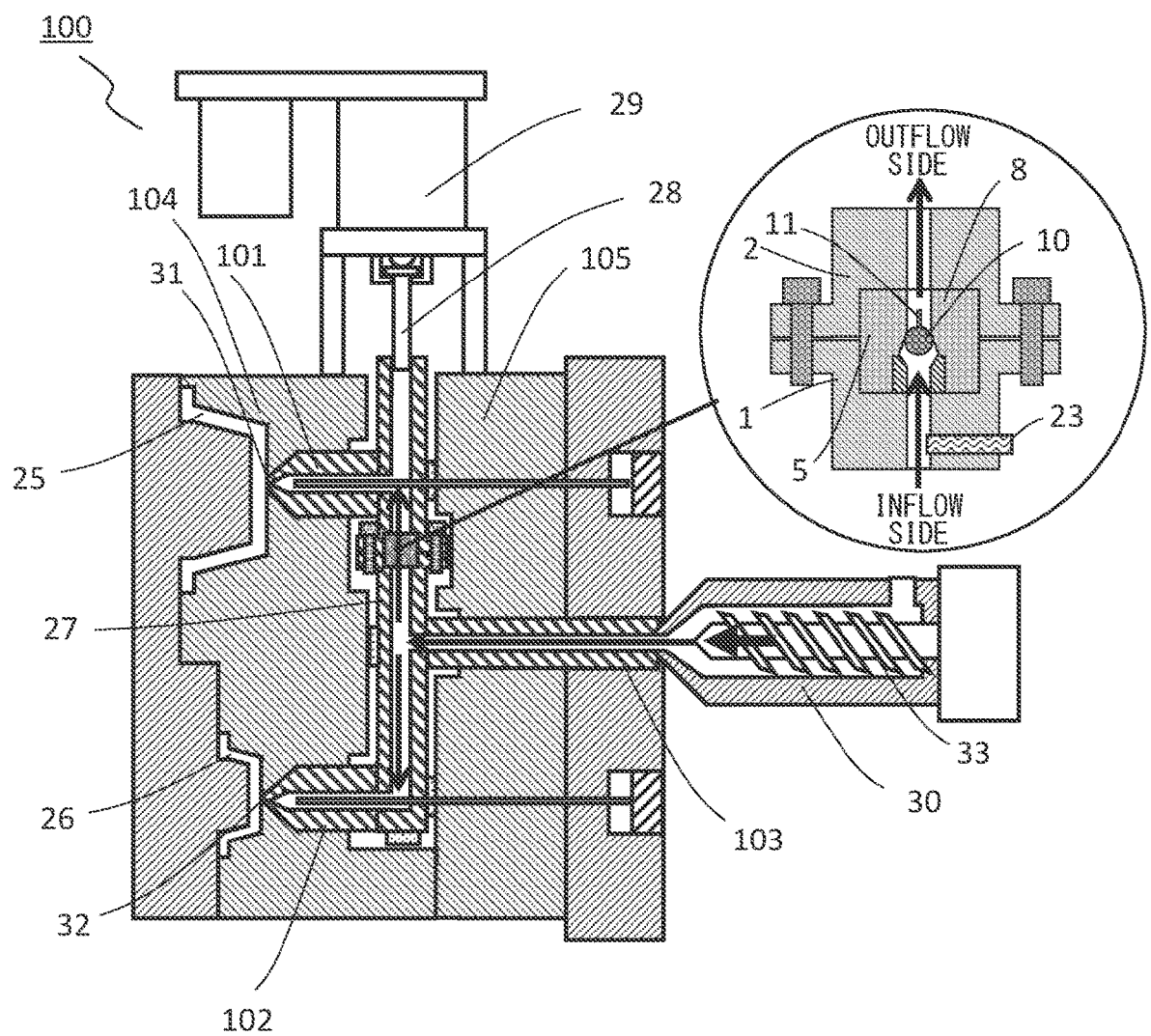
FIG. 17 is a schematic cross-sectional view of a family molding apparatus according to a ninth embodiment.

FIG. 17 is a schematic cross-sectional view of a family molding apparatus 100 equipped with the backflow prevention valve 5. FIG. 17 illustrates a state in which the family molding apparatus 100 performs an injection step described later. In the description of the backflow prevention valve 5 illustrated in the drawings, parts common to the description of the first embodiment will be omitted or simplified.

Configuration of Family Molding Apparatus

The family molding apparatus 100 includes a molten resin supply unit 30 and a manufacturing unit, and the manufacturing unit includes a first cavity 25, a second cavity 26, a hot runner 27, a plunger 28, and a pressure control device 29 that drives the plunger 28. The first cavity 25 and the second cavity 26 are cavities for molding resin molded products having different shapes, and an inner volume of the first cavity 25 is larger than that of the second cavity 26. A molten resin is supplied from the molten resin supply unit 30 to the first cavity 25 and the second cavity 26 via the manifold-shaped hot runner 27. An openable and closable first gate valve 31 is provided at the tip of the injection nozzle 101 on the first cavity 25 side, and an openable and closable second gate valve 32 is provided at the tip of the injection nozzle 102 on the second cavity 26 side.

The backflow prevention valve 5 described in the first embodiment is mounted in the flow path branched from the molten resin supply unit 30 side to the first cavity 25 side in the hot runner 27 in a direction in which the molten resin supply unit 30 is on the inflow side. That is, the backflow prevention valve 5 is mounted such that the direction from the molten resin supply unit 30 toward the first cavity 25 is the forward flow direction. The backflow prevention valve 5 is sandwiched between a first flow path member 1 and a second flow path member 2 constituting the hot runner 27, and as illustrated in FIG. 1, the first flow path member 1 and the second flow path member 2 are fastened by bolts. Further, the first flow path member 1 is provided with a pressure sensor 23 for measuring the resin pressure in the flow path.

The injection nozzle 101 and the second flow path member 2 installed between the second flow path member 2 and the first cavity 25 are formed as separate members and are not fastened. A heater (not illustrated) is disposed in the injection nozzle 101 and the second flow path member 2, and the temperature is raised when the molten resin flows. The injection nozzle 101 is thermally expanded by the temperature rise, and thus, the injection nozzle 101 and the second flow path member 2 are firmly in contact with each other. As a result, molten resin leakage does not occur at the contact portion between the injection nozzle 101 and the second flow path member 2. The injection nozzle 102 and the first flow path member 1 also have the same configuration as described above, and the resin leakage does not occur at the contact portion between the injection nozzle 102 and the first flow path member 1. Furthermore, a hot runner sprue 103 is installed between the first flow path member 1 and the molten resin supply unit 30.

The hot runner sprue 103 and the first flow path member are fastened by a bolt (not illustrated). During molding, the molten resin supply unit 30 is pressed against the hot runner sprue 103. Due to this pressing force, a contact portion between the molten resin supply unit 30 and the hot runner sprue 103 and a contact portion between the molten resin supply unit and the first flow path member 1 are firmly in contact with each other, and thus, resin leakage does not occur. When replacing the backflow prevention valve 5, first, the mold member 104 and the mold member 105 are separated in a direction (right-left direction in FIG. 17) in which the mold member 104 and the mold member 105 are arranged, and the set of hot runners 27 is removed from the mold. Thereafter, the injection nozzles 101 and 102, the hot runner sprue 103, and the hot runner 27 are separated from each other in the direction (right-left direction in FIG. 17) in which the injection nozzles 101 and 102, the hot runner sprue 103, and the hot runner 27 are arranged. As a result, the injection nozzle 101, the injection nozzle 102, and the hot runner sprue 103 are removed from the hot runner 27. Thereafter, in the direction (up-down direction in FIG. 17) in which the first flow path member 1 and the second flow path member 2 are arranged, the fastening bolts of the first flow path member 1 and the second flow path member 2 are removed to separate the first flow path member 1 and the second flow path member 2. As a result, the backflow prevention valve 5 can be removed from between the first flow path member 1 and the second flow path member 2.

The first flow path member 1 and the second flow path member 2 are made of SUS material, and are provided with a heater (not illustrated) for maintaining the molten resin in the flow path at an appropriate temperature (for example, 230° C.). The dimensions described with reference to FIGS. 1 and 2 are L1+L2=35 mm and LB=35.03 mm. In a state where TM=0.03 mm is provided as a fastening allowance, the flange portions of the first flow path member 1 and the second flow path member 2 are fastened with 12 bolts 6 (for example, M12). A housing 8 (for example, cylindrical outer peripheral diameter φ30 mm) of the backflow prevention valve 5 is made of SUS material, and a flow path diameter at the position where the flow path cross-sectional area is maximized is set to φ14 mm. The first valve seat portion 9 is formed of high-speed steel having a hardness higher than that of the SUS material of the first flow path member 1, and the diameter of the outer peripheral surface is 18 mm. The first valve seat portion 9 is fitted to the housing 8 by shrinkage fitting. A spherical valve body 10 (for example, φ10 mm) made of cemented carbide (cemented carbide) is inserted into the valve chamber defined by the housing 8 and the first valve seat portion 9.

Assuming that the mold member 104 or the injection nozzle 101 is referred to as a first component, and the mold member 105, the injection nozzle 102, or the hot runner sprue 103 is referred to as a second component, the present embodiment has the following characteristic configuration. The first component is detachably connected to the first flow path member 1, and the second component is detachably connected to the second flow path member 2. The attachment/detachment direction (right-left direction in FIG. 17) of the first flow path member 1 and the first component member intersects with the direction (up-down direction in FIG. 17) in which the first flow path member 1 and the second flow path member 2 are arranged. The attachment/detachment direction (right-left direction in FIG. 17) of the second flow path member 2 and the second component member intersects with the direction (up-down direction in FIG. 17) in which the first flow path member 1 and the second flow path member 2 are arranged. In this way, for example, there are advantages that miniaturization of the device can be realized, assembly and disassembly of the device (attachment and detachment of members) can be facilitated, and a space required for assembly and disassembly of the device can be omitted. At least one of the attachment/detachment direction of the first flow path member 1 and the first component and the attachment/detachment direction of the second flow path member 2 and the second component can be the same as the direction in which the first flow path member 1 and the second flow path member 2 are arranged. However, when the four members of the first component, the first flow path member 1, the second flow path member 2, and the second component are arranged in a line, the above-described advantages can be impaired.

OTHER EMBODIMENTS

Note that the present invention is not limited to the embodiments described above, and many modifications can be made within the technical idea of the present invention. For example, the valve body used for the backflow prevention valve may be any member that can be displaced by the flow pressure and can close the flow path by being in close contact with the first valve seat portion by the flow pressure in the reverse flow direction, and the shape thereof is not necessarily limited to a sphere.

In addition, in the preplastication type injection molding machine according to the second embodiment and the in-line screw-type family molding apparatus according to the third embodiment, an example in which the backflow prevention valve according to the first embodiment is mounted has been described, but the backflow prevention valve according to the fourth to seventh embodiments may be mounted.

In addition, the target device on which the backflow prevention valve according to the embodiment is mounted is not limited to a preplastication type injection molding machine or an in-line screw-type family molding apparatus, and can be mounted on various devices having a flow path of a molten resin. For example, the backflow prevention valve can be mounted on a molding machine such as a plunger type molding machine, a preplastication type molding machine, a plunger preplastication type molding machine, a screw preplastication type molding machine, and a screw type molding machine.

A device including a member that defines a flow path can be referred to as a flow path device. Although the molten resin has been described as the fluid flowing through the flow path, the fluid flowing through the flow path is not limited to the molten resin. In addition, the target device (flow path device) on which the backflow prevention valve according to the embodiment is mounted is not limited to a device including a flow path of a molten resin. Since it is sufficient that the valve body can be displaced by the pressure of the fluid flowing through the flow path of the target device, for example, a device including a flow path of molten metal, a device including a flow path of water or the like which is liquid even at room temperature, or a device including a flow path of gas such as compressed air may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-31860, filed Mar. 1, 2021, and Japanese Patent Application No. 2022-5160, filed Jan. 17, 2022, which are hereby incorporated by reference herein in their entirety.

What is claimed is:

1. An apparatus comprising:
   a first flow path member configured to define a first section of a flow path;
   a second flow path member configured to define a second section of the flow path;
   a valve unit configured to suppress backflow in the flow path; and
   a fastening member configured to fasten the first flow path member and the second flow path member,
   wherein in a state where the first flow path member and the second flow path member are fastened by the fastening member, the valve unit is sandwiched between the first flow path member and the second flow path member, and the first section and the second section are connected via the valve unit, and
   the valve unit is detachable from the first flow path member and the second flow path member in a state where fastening of the first flow path member and the second flow path member by the fastening member are released.

2. The apparatus according to claim 1, wherein the first flow path member and the second flow path member are fastened to be separated from each other via a fastening allowance of the fastening member.

3. The apparatus according to claim 2, wherein the fastening allowance of the fastening member is 7 µm to 50 µm.

4. An apparatus comprising:
a first flow path member configured to define a first section of a flow path;
a second flow path member configured to define a second section of the flow path; and
a valve unit configured to suppress backflow in the flow path,
wherein the first section and the second section are connected via the valve unit,
the valve unit comprises a displaceable valve body and a first valve seat portion configured to close the flow path in a case where the displaceable valve body abuts on the first valve seat portion, and
the first valve seat portion is configured to abut on the first flow path member and is made of a material having higher hardness than that of a material constituting the first flow path member.

5. The apparatus according to claim 4, wherein the first valve seat portion is formed of a material having a hardness (Rockwell hardness) of HRC 50 to less than 80, and
the first flow path member is formed of a material having a hardness (Rockwell hardness) of HRC 20 to less than 50.

6. The apparatus according to claim 4, wherein the valve unit further comprises a housing configured to abut on the first valve seat portion, and
the displaceable valve body is housed in a valve chamber defined by the housing and the first valve seat portion.

7. The apparatus according to claim 6, wherein the housing comprises a second valve seat portion configured not to close the flow path in a case where the displaceable valve body abuts on the second valve seat portion.

8. The apparatus according to claim 6, wherein the housing and the first valve seat portion are configured to abut on each other at a position where a flow path cross-sectional area of the valve chamber is maximized.

9. The apparatus according to claim 1, wherein the first flow path member is provided with a pressure sensor.

10. The apparatus according to claim 1, wherein the flow path is a flow path of a molten resin.

11. The apparatus according to claim 1, further comprising:
a first component detachably connected to the first flow path member; and
a second component detachably connected to the second flow path member,
wherein an attachment/detachment direction of the first flow path member and the first component and an attachment/detachment direction of the second flow path member and the second component intersect a direction in which the first flow path member and the second flow path member are arranged.

12. A mold comprising the apparatus according to claim 1,
wherein a cavity is provided in the mold.

13. An injection molding machine comprising:
the apparatus according to claim 1;
a supply unit configured to supply a molten resin; and
an injection unit configured to inject the molten resin,
wherein the first flow path member and the second flow path member are configured to connect the supply unit and the injection unit.

14. A method for manufacturing a resin molded product using the injection molding machine according to claim 13, the method comprising:
a metering step;
an injection step; and
a pressure holding step,
wherein the valve unit is opened in the metering step, and the valve unit is closed in the injection step and the pressure holding step.

15. A manufacturing unit comprising:
the apparatus according to claim 1;
a supply unit configured to supply a molten resin;
a first cavity; and
a second cavity,
wherein the first flow path member and the second flow path member are provided between the supply unit and the first cavity among manifolds connecting the supply unit, the first cavity, and the second cavity.

16. A method for manufacturing a resin molded product using the manufacturing unit according to claim 15, the method comprising:
a metering step;
an injection step; and
a pressure holding step,
wherein the valve unit is opened in the metering step and the injection step, and
the valve unit is closed in the pressure holding step.

* * * * *